(12) United States Patent
Iwaki et al.

(10) Patent No.: US 8,162,083 B2
(45) Date of Patent: Apr. 24, 2012

(54) CRAWLER DEVICE AND AUTOMATIC ATTITUDE CONTROL OF THE SAME

(75) Inventors: Hidekazu Iwaki, Tokyo (JP); Shingo Tsukui, Tokyo (JP); Seiji Oomura, Tokyo (JP)

(73) Assignee: Topy Kogyo Kabushiki Kaisha, Tokyo (JP)

( * ) Notice: Subject to any disclaimer, the term of this patent is extended or adjusted under 35 U.S.C. 154(b) by 343 days.

(21) Appl. No.: 12/523,610

(22) PCT Filed: Jan. 24, 2008

(86) PCT No.: PCT/JP2008/050970
§ 371 (c)(1),
(2), (4) Date: Oct. 15, 2009

(87) PCT Pub. No.: WO2008/090946
PCT Pub. Date: Jul. 31, 2008

(65) Prior Publication Data
US 2010/0084204 A1    Apr. 8, 2010

(30) Foreign Application Priority Data
Jan. 25, 2007   (JP) ................................ 2007-014652

(51) Int. Cl.
*B62D 55/00*    (2006.01)
(52) U.S. Cl. ...................................... 180/9.32; 180/9.52
(58) Field of Classification Search ................. 180/9.52, 180/9.5, 9.1, 9.32, 6.7, 901; 280/5.22
See application file for complete search history.

(56) References Cited

U.S. PATENT DOCUMENTS

| | | | | |
|---|---|---|---|---|
| 762,781 A * | 6/1904 | Walker | .......................... | 180/9.46 |
| 1,592,654 A * | 7/1926 | Bremer | ........................ | 180/9.32 |
| 3,288,234 A * | 11/1966 | Feliz | ............................... | 180/6.5 |
| 4,595,068 A * | 6/1986 | Seeber | .......................... | 180/9.52 |
| 4,676,765 A * | 6/1987 | McKay et al. | ................. | 446/457 |

(Continued)

FOREIGN PATENT DOCUMENTS

JP      58080387 A    5/1983
(Continued)

*Primary Examiner* — Tashiana Adams
(74) *Attorney, Agent, or Firm* — Stephen B. Salai, Esq.; Thomas B. Ryan; Harter Secrest & Emery LLP

(57) ABSTRACT

Theme
To provide a small-sized crawler device that can stably ride over bumps or steps or stairs.
Means to Solve
The crawler device includes a device body (1) having main crawlers (20) on its left and right and auxiliary crawlers (30) provided as auxiliary members at one end portion of the device body. Before the crawler device ascends a step or stairs with the auxiliary crawler (30) positioned backward, the controller (65) brings the auxiliary crawler (30) into a preparatory state in which the auxiliary crawler (30) is freely rotatable with respect to the main crawler (20) or the auxiliary crawler (30) is maintained in a position above a line extending longitudinally from the main crawler by a predetermined angle. After the main crawler (20) starts ascending the step or stairs and when a tilt angle of the device body (1) detected by a tilt sensor (60) reaches or exceeds a threshold angle, the controller (65) controls the auxiliary crawler (30) to be rotated downward to reduce the tilt angle of the device body (1), thereby preventing the crawler device from toppling backward.

11 Claims, 18 Drawing Sheets

U.S. PATENT DOCUMENTS

| | | |
|---|---|---|
| 7,578,565 B2 | 8/2009 | Hirose et al. |
| 7,891,446 B2 * | 2/2011 | Couture et al. ............. 180/9.32 |
| 2003/0183428 A1 * | 10/2003 | Hedeen ........................ 180/9.32 |
| 2004/0007833 A1 | 1/2004 | Takahashi et al. |
| 2007/0209844 A1 * | 9/2007 | Kamimura ................... 180/9.32 |
| 2008/0223630 A1 * | 9/2008 | Couture et al. ............. 180/9.32 |
| 2008/0284244 A1 | 11/2008 | Hirose et al. |
| 2009/0173553 A1 * | 7/2009 | Won ............................. 180/9.32 |
| 2011/0155483 A1 * | 6/2011 | Couture et al. ............. 180/9.32 |

FOREIGN PATENT DOCUMENTS

| | | |
|---|---|---|
| JP | 61054378 A | 3/1986 |
| JP | 61180885 U | 11/1986 |
| JP | 61275069 A | 12/1986 |
| JP | 63203483 A | 8/1988 |
| JP | 10007036 A | 1/1998 |
| JP | 2001063642 A | 3/2001 |
| JP | 2005001445 A | 1/2005 |
| JP | 2005231522 A | 9/2005 |

* cited by examiner

CRAWLER DEVICE AND AUTOMATIC ATTITUDE CONTROL OF THE SAME

TECHNICAL FIELD

This invention relates to a crawler device that can ride over bumps or steps or stairs and automatic attitude control of the crawler device.

BACKGROUND ART

As shown in Patent Document 1, crawler devices for carrying load, having features for ascending and descending stairs are known in the art. The crawler device of the Patent Document 1 includes a device body having a base and a pair of main crawlers mounted on the left and right of the base and a pair of auxiliary crawlers respectively rotatably connected to one end portions of the main crawlers.

In the crawler device mentioned above, the length of the main crawler is greater than twice the distance between adjacent nosings of the stairs, which enables the crawler device to ascend the stairs stably with the main crawler straddling over three stair nosings. The length of the auxiliary crawler is half or smaller than the length of the main crawler.

When the crawler device ascends stairs, the auxiliary crawler is positioned forward in a direction of travel, being raised at a predetermined angle. When the auxiliary crawler hits the nosing of the first stair, the auxiliary crawler starts ascending the nosing of the first stair. Subsequently, an end portion of the main crawler reaches the nosing of the first stair, and the main crawler proceeds to ascend nosings of the second and the third stairs. After that, the main crawler ascends the stairs maintaining the same tilt angle as an inclination of the stairs.

The device body has a tilt sensor. When a measured tilt angle of the device body reaches a predetermined angle, the auxiliary crawler is rotated downward to be located on a line extending longitudinally from the main crawler, i.e. to be in alignment with the main crawler.

In the crawler device mentioned above, a diameter of a distal end portion (end portion farther from the main crawler) of the auxiliary crawler is smaller than that of the main crawler. Therefore, when the crawler device ascends stairs with the auxiliary crawler in alignment with the main crawler, the auxiliary crawler never contacts nosings of the stairs. Only the main crawler is used to ascend the stairs.

Patent Document 1: Japanese Patent Publication No. 3796490

DISCLOSURE OF THE INVENTION

Problem to be Solved by the Invention

In recent years, demand for small-sized crawler devices for survey work, etc. equipped with a video-camera, etc. is growing. If the length of the main crawler of the crawler device of Patent Document 1 is reduced to meet the demand for downsizing, the crawler device will not be able to ride over stairs. This is because after the main crawler rides on the first stair nosing, the crawler device will topple backward due to an increase in the tilt angle of the device body.

Means for Solving the Problem

In order to solve the above mentioned problem, the present invention provides a crawler device comprising:

a device body (1) having a pair of left and right main crawlers (20), each of the main crawlers (20) including an endless belt (26);

auxiliary members (30) disposed in one of opposite end portions of the device body (1) opposing in a direction of travel of the crawler device;

an actuator (50) for rotating the auxiliary members (30) in an up-down direction;

a tilt sensor (60) for detecting a tilt angle of the device body in a front-rear direction; and a controller (65) for controlling the actuator to control an angle of the auxiliary member with respect to the main crawler;

wherein before the device body (1) ascends a step or stairs with the auxiliary member (30) positioned backward, the controller (65) brings the auxiliary member (30) into a preparatory state in which the auxiliary member (30) is freely rotatable with respect to the main crawler (20) or the auxiliary member (30) is maintained in a rotated position located above a line extending longitudinally from the main crawler; and wherein when the main crawler starts ascending the step or stairs and the tilt angle of the device body (1) detected by the tilt sensor (60) reaches or exceeds a first threshold angle, the controller (65) causes the auxiliary member to be rotated downward.

In this arrangement, the crawler device can be prevented from toppling backward despite the shortness of the main crawler because the rotation of the auxiliary member backward at the start of ascending the step or stairs reduces the tilt angle of the device body or restrains the increase of the tilt angle of the device body.

Preferably, the controller (65) causes the auxiliary member (30) to be in alignment with or in near alignment with the main crawler (20) when the tilt angle of the device body (1) detected by the tilt sensor (60) reaches or exceeds the first threshold angle. In this arrangement, the crawler device can ascend the stairs in a stable manner.

Preferably, the auxiliary members are auxiliary crawlers (30) extending linearly, respectively including another endless belt (36) and driven synchronously with the main crawlers (20). In this arrangement, the crawler device can ascend the stairs or the step using both the belt of the main crawler and the belt of the auxiliary crawler.

Preferably, the auxiliary crawler (30) is connected to the main crawler (20) via a common sprocket (25) and a maximum overall length of the crawler device is determined by the length of the crawler device when the main crawler and the auxiliary crawler are arranged in alignment with each other.

Preferably, the auxiliary crawler (30) can be located in a position overlapping the main crawler (20), and a minimum overall length of the crawler device is equal to the length of the main crawler or the length of the auxiliary crawler in the overlapped condition. In this arrangement, the crawler device can be stored in a minimum space.

Preferably, the length of the main crawler (20) is smaller than twice a distance between adjacent stair nosings of the stairs to be ascended and the maximum overall length of the crawler device is greater than twice the distance between the adjacent stair nosings and smaller than three times the distance between the adjacent stair nosings. In this arrangement, even when the length of main crawler is reduced to such an extent that the crawler device could not ascend the stairs in a stable manner if the main crawler were used alone, the crawler device can ascend the stairs in a stable manner with the help of the auxiliary crawler.

Preferably, when the tilt angle of the device body (1) detected by the tilt sensor (60) becomes equal to or smaller than a second threshold angle that is smaller than the first threshold angle as the main crawler (20) rides over the step or stairs, the controller (65) causes the auxiliary member (30) to return to the preparatory state.

Preferably, when the controller (65) causes the main crawler (20) to proceed forward and descend the step or stairs, the controller (65) causes the auxiliary member (30) to be maintained in alignment with or in near alignment with the main crawler (20) behind the main crawler (20); and wherein when the tilt angle of the device body (1) detected by the tilt sensor (60) becomes equal to or smaller than a third threshold angle before the crawler device finishes descending the step or stairs, the controller (65) causes the auxiliary member to be rotated upward with respect to the main crawler, thereby reducing the tilt angle of the device body.

In this arrangement, the crawler device can land softly when finishing descending the stairs or step.

Preferably, the tilt sensor (60) can also detect a tilt angle in a left-right direction, the actuator (50) can individually rotate the auxiliary crawlers that are arranged in the left and right; and wherein when the tilt angle of the device body (1) in the left-right direction detected by the tilt sensor reaches or exceeds a fourth threshold angle as one of the main crawlers rides on the step, the controller (65) causes the auxiliary crawler (30) connected to the other of the main crawlers (20) to be rotated downward, thereby raising the other of the main crawlers to reduce the tilt angle of the device body in the left-right direction.

In this arrangement, when the device body is tilted to the left or right, the tilt angle can be reduced, and thus the crawler device can be prevented from toppling to the left and right.

Preferably, the device body (1) has a first distance sensor (61) for measuring distance in an obliquely downward direction disposed in the other of the opposite end portions of the device body (1) in which the auxiliary members (30) are not disposed; and wherein when the distance detected by the first distance sensor reaches or exceeds a first threshold distance immediately before the crawler device finishes ascending the step or stairs, the controller (65) causes the auxiliary member to be rotated downward, thereby reducing the tilt angle of the device body.

In this arrangement, impact from road surface can be alleviated or eliminated when the crawler device finishes ascending the stairs or step with the auxiliary member positioned backward.

Preferably, when the distance detected by the first distance sensor (61) reaches or exceeds a second threshold distance immediately before the crawler device starts descending the step or stairs with the auxiliary member (30) positioned backward, the controller (65) causes the auxiliary member (30) to be rotated downward, thereby tilting the device body (1) downward toward the front.

In this arrangement, impact from going of the stairs or other surfaces can be alleviated or eliminated when the crawler device starts descending the stairs or step with the auxiliary member positioned backward.

Preferably, the device body (1) has a second distance sensor (62) for measuring distance in a direction higher than the direction of measurement of the first distance sensor (61) disposed in the other end portion of the device body (1) in which the auxiliary members (30) are not disposed; and wherein when the distance detected by the second distance sensor (62) becomes equal to or smaller than a third threshold distance immediately before the crawler device finishes descending the step or stairs, the controller (65) causes the auxiliary member to be rotated upward, thereby reducing the tilt angle of the device body.

In this arrangement, the crawler device can land softly when finishing descending the stairs or step with the auxiliary member positioned backward.

Preferably, the device body (1) has a third distance sensor (63) for measuring distance in an obliquely downward direction disposed in the one of the opposite end portions of the device body (1) in which the auxiliary members (30) are disposed; and wherein when the distance detected by the third distance sensor (63) reaches or exceeds a fourth threshold distance immediately before the crawler device starts to descend the step or stairs with the auxiliary member positioned forward, the controller (65) causes the auxiliary member (30) to be rotated downward, thereby tilting the auxiliary member downward toward the front.

In this arrangement, impact from going of the stairs or other surfaces can be alleviated or eliminated when the crawler device starts descending the stairs or step with the auxiliary member positioned forward.

Preferably, the device body (1) has a fourth distance sensor (64) for measuring distance in a direction higher than the direction of measurement of the third distance sensor (63) disposed in the one of the opposite end portions of the device body (1) in which the auxiliary members (30) are disposed; and wherein when the distance detected by the fourth distance sensor (64) becomes equal to or smaller than a fifth threshold distance immediately before the crawler device finishes descending the step or stairs, the controller (65) causes the auxiliary member (30) to be rotated upward.

In this arrangement, the crawler device can land softly when finishing descending the stairs or step with the auxiliary member positioned forward.

Effect of the Invention

According to the present invention, a crawler device can ride over stairs or bumps or steps in a stable manner without toppling down even when reduced in size.

Figure 1:
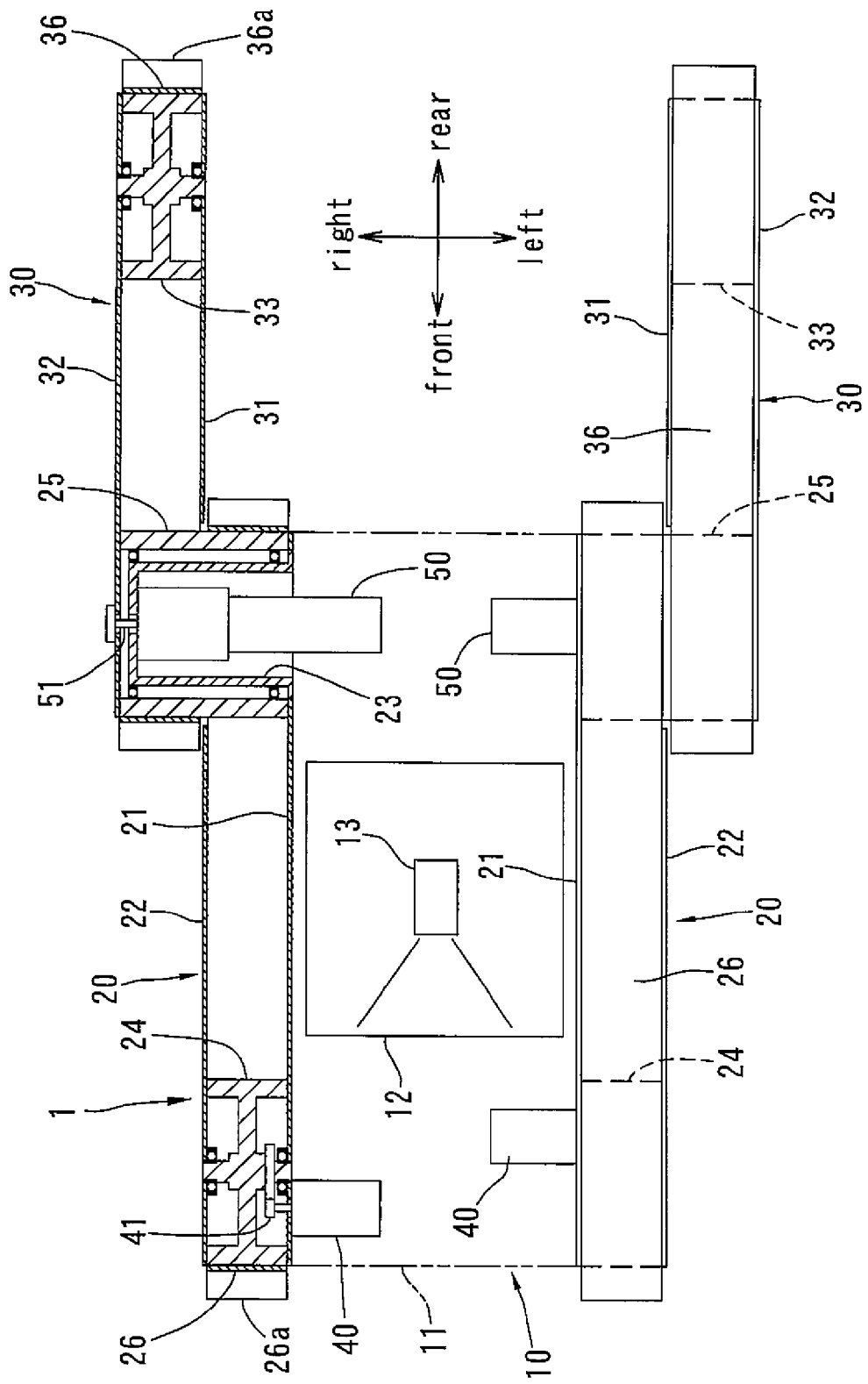
FIG. 1 is a partially cut-away plan view of a crawler device according to the first embodiment of the present invention.

DESCRIPTION OF THE REFERENCE NUMERALS 1 device body
20 main crawler
26 belt
30 auxiliary crawler (auxiliary member)
36 belt
40 drive motor
50 rotation motor (actuator)
60 tilt sensor
61 distance sensor
62 distance sensor
63 distance sensor
64 distance sensor
65 controller

BEST MODE FOR CARRYING OUT THE INVENTION

A crawler device for survey work according to a first embodiment of the present invention will now be described with reference to FIGS. 1 to 14. Directions, i.e. front, rear, left and right, are defined in FIG. 1 to facilitate understanding of the technical features described hereinafter.

Figure 2:
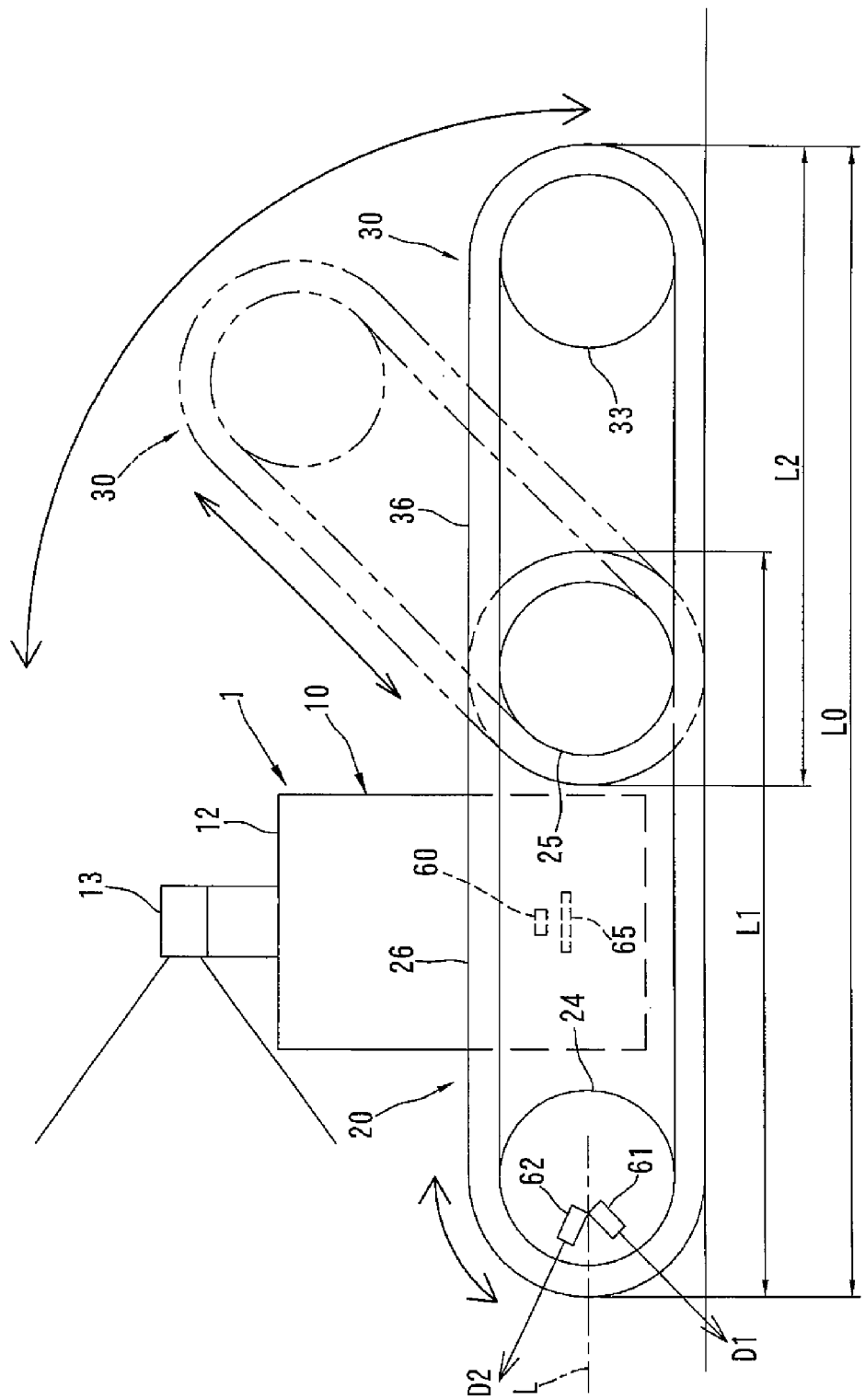
FIG. 2 is a side view of the crawler device of FIG. 1.

As shown in FIGS. 1 and 2, the crawler device includes a device body 1. The device body 1 has a base 10 and a pair of main crawlers 20 disposed on left and right of the base 10.

The base 10 has a frame 11 shown in imaginary lines in FIG. 1 and a pedestal 12 disposed on the frame 11. A video camera 13 (shown in FIGS. 1 and 2 only), for example, is installed on the pedestal 12. In this embodiment, the video camera 13 is fixed to the pedestal 12, with the video camera 13 oriented forward.

Each of the pair of main crawlers 20 has an inner side plate 21 and an outer side plate 22 that are positioned vertically and extending straight in the front-rear direction in elongated shapes.

The inner side plates 21 of the pair of main crawlers 20 are fixed to left and right side of the frame 11 of the base 10.

A support 23 is fixed to a rear end portion of the inner side plate 21 of each of the main crawlers 20. The support 23 has a closed-ended cylindrical configuration. An axis of the support 23 horizontally extends in the left-right direction, protruding from the outer side plate 22.

The main crawler 20 further includes a first sprocket 24, a second sprocket 25 and an endless belt 26.

The first sprocket 24 is rotatably disposed between front end portions of the side plates 21, 22 through bearings.

The second sprocket 25 is rotatably disposed on an outer periphery of the support 23 through bearings. The dimension of the second sprocket 25 in an axial direction is larger than that of the first sprocket 24 (generally twice as large) and the second sprocket 25 protrudes from the outer side plate 22.

The belt 26 is trained between the first sprocket 24 and the second sprocket 25, covering approximately one half of a width of the second sprocket 25 (corresponding to an area between the side plates 21, 22). The belt 26 is meshed with the sprockets 24, 25 in such a manner that engagement holes formed in the belt 26 are engaged with engagement projections formed in outer peripheries of the sprockets 24, 25. At least an outer peripheral layer of the belt 26 is made of rubber and the belt 26 has tread lugs 26a.

A casing for a drive motor 40 is fixed in a front end portion of the inner side plate 21 of each of the main crawlers 20. Rotary torques in positive and negative directions are transmitted from an output shaft of the drive motor 40 to the first sprocket 24 via a speed reduction mechanism 41.

A pair of auxiliary crawlers 30 as auxiliary members is connected to only a rear end portion of the device body 1 such that the auxiliary crawlers 30 are rotatable in the up-down direction. To be more specific, one end portion of the auxiliary crawler 30 is rotatably coupled to a rear end portion of the corresponding main crawler 20, with the auxiliary crawler 30 disposed adjacent to an outer side of the main crawler 20.

Each of the auxiliary crawlers 30 has an inner side plate 31 and an outer side plate 32 that are positioned vertically and extending straight in elongated shapes. The second sprocket 25 is received between one end portions of the side plates 31, 32.

On the other hand, between the other end portions of the side plates 31, 32 of each of the auxiliary crawlers 30, a third sprocket 33 is rotatably supported via bearings. The first, second and third sprockets 24, 25, 33 have same diameters in this embodiment. The first, second and third sprockets 24, 25, 33 may not have the same diameter.

An endless belt 36 is trained between the second sprocket 25 and the third sprocket 33, covering the other half of the width of the second sprocket 25 (corresponding to an area between the side plates 31, 32 of the auxiliary crawler 30). The belt 36 is meshed with the sprockets 25, 33 and has tread lugs 36a in a similar manner to the belt 26 of the main crawler 20.

Driven by the drive motor 40, the first sprocket 24 of the main crawler 20 rotates, thereby causing the belt 26 of the main crawler 20 to rotate. The rotation of the belt 26 causes the second sprocket 25 shared by the crawlers 20, 30 to rotate. The rotation of the second sprocket 25 causes the belt 36 of the auxiliary crawler 30 to rotate in a same direction and at a same speed as the belt 26 of the main crawler 20 (in effect, the belt 36 is driven by the belt 26).

A casing for a rotation motor 50 (actuator) having a built-in speed reduction mechanism is fixed to a bottom wall of the support 23 of each of the main crawlers 20. An output shaft 51 of the rotation motor 50 extends horizontally in the left-right direction through the bottom wall of the support 23 and is fixed to the outer side plate 32 of the auxiliary crawler 30.

Each of the auxiliary crawlers 30 is rotated with respect to the main crawler 20 by the rotation motor 50 in clockwise and counterclockwise directions over the entire angular range about a horizontal axis extending in the left-right direction.

As shown in FIG. 2, components including a tilt sensor 60, first and second distance sensors 61, 62, a controller 65, and a battery are disposed on the base 10. The tilt sensor 60 detects a tilt angle of the base 10 with respect to a horizontal axis extending in the front-rear direction and a tilt angle of the base 10 with respect to a horizontal axis extending in the left-right direction.

The distance sensors 61, 62 typically are laser distance meters and are disposed, as shown in FIG. 2, in a front end portion (end portion where the auxiliary crawlers 30 are not disposed) of the device body 1. The first distance sensor 61 measures a distance to an object located obliquely downward toward the front. The second distance sensor 62 measures a distance to an object located obliquely upward toward the front. Directions of measurement of the distance sensors 61, 62 are indicated by reference numerals D1, D2 in FIG. 2.

The direction of measurement D1 of the first distance sensor 61 is −45 degrees with respect to an axis L extending parallel to a longitudinal direction of the main crawler 20 and the direction of measurement of the second distance sensor 62 is +30 degrees with respect to the same axis L, where "−" means downward direction and "+" means upward direction (these signs of directions are adhered to throughout the document).

The controller 65 includes motor drivers for the motors 40, 50, a microcomputer and a communication device. The controller 65 receives control signals from a remote controller (not shown) and detection signals from the tilt sensor 60 and the distance sensors 61, 62 to control the motors 40, 50. Video signals form the video camera 13 are transmitted to the remote controller via the controller 65 and displayed on a display attached to or connected to the remote controller.

The crawler device of the present invention is small-sized. Dimensions of the crawlers 20, 30 will be described with reference to FIG. 2.

A length L1 of the main crawler 20 is greater than a distance Lx between adjacent nosings 100a of stairs (see FIG. 4A) which is to be ridden over by the crawler, but is smaller than twice the distance Lx.

A length L2 of the auxiliary crawler 30 is generally the same as the length L1 of the main crawler 20. Although the length L2 of the auxiliary crawler 30 is slightly smaller than the length L1 of the main crawler 20 in this embodiment, the length L2 may be as great as L1 or slightly greater than L1.

A maximum overall length L0 of the crawler device is determined by the main crawler 20 and the auxiliary crawler 30 when the auxiliary crawler 30 is placed behind the main crawler 20 in alignment with the main crawler 20. The maximum overall length L0 is greater than twice the distance Lx between the adjacent stair nosings 100a and smaller than three times the distance Lx.

The crawler device of this embodiment is designed to ascend and descend standard-sized stairs with a riser height of 70 to 250 mm and a going dimension of 150 to 400 mm. The length L1 of the main crawler 20 is 200 to 500 mm, the length L2 of the auxiliary crawler 30 is 200 to 500 mm and the maximum overall length L0 of the crawler device is 300 to 900 mm.

Figure 14:
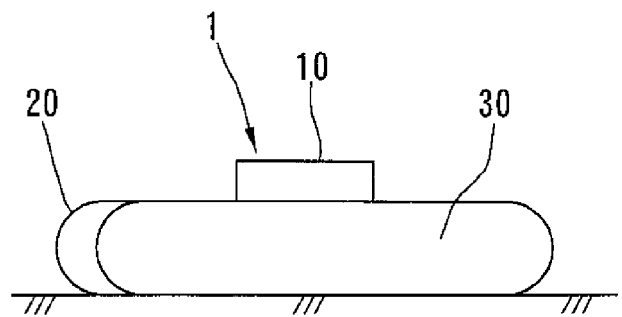
FIG. 14 is a schematic side view of the crawler device with the auxiliary crawler overlapped on the main crawler.

As shown in FIG. 14, the auxiliary crawler 30 can be rotated forward to be positioned parallel to and overlapping the main crawler 20. The overall length of the crawler device becomes the minimum in this condition. The minimum overall length is equal to the length L1 of the main crawler 20. Therefore, the crawler device can be stored in a small space. In a case where the auxiliary crawler 30 is longer than the main crawler 20, the minimum overall length is equal to the length L2 of the auxiliary crawler 30.

Operation of the crawler device will now be described. In a normal mode, the two drive motors 40 are controlled via the controller 65 by remote control to drive the two main crawlers 20. The control includes the selection of direction of travel (forward, backward or turning) and the control of the running speed.

In the normal mode, the two rotation motors 50 are controlled via the controller 65 by remote control, thereby the angle of the auxiliary crawler 30 with respect to the main crawler 20 is controlled.

In the normal mode, when running on a flat surface or a surface with small elevation changes, the auxiliary crawler 30 is preferably raised from a position in alignment with the main crawler 20 behind the main crawler 20 as shown in imaginary lines in FIG. 2. This serves to reduce the resistance against the ground. Alternatively, the auxiliary crawler 30 may be released from the rotation motor 50 to be freely swingable with respect to the main crawler 20. In this condition, the auxiliary crawler 30 slightly swings with respect to the main crawler in accordance with the road surface.

Figure 4A:
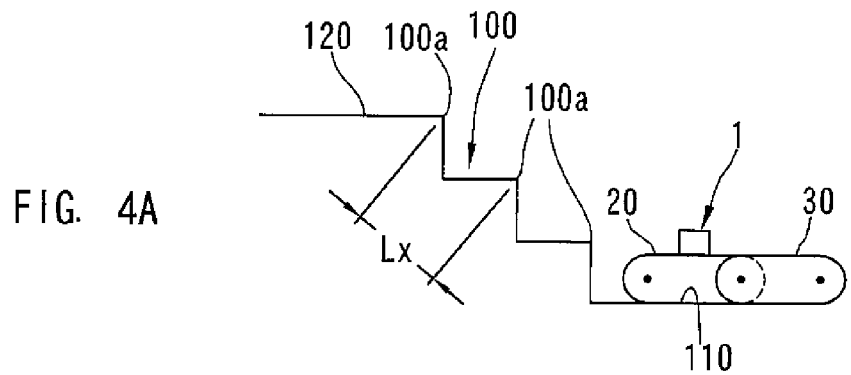
FIG. 4A is a schematic side view of the crawler device in an initial state in the control of FIG. 3.

An operator remotely controls the crawler device to go forward observing the images from the video camera 13. When the crawler device approaches stairs 100 as shown in FIG. 4A, an ascent mode for ascending a step or stairs is selected by the remote control. In FIG. 4, a lower road surface continuing from the lower end of the stairs 100 is indicated with the reference numeral 110, and an upper road surface continuing form the upper end of the stairs 100 is indicated with the reference numeral 120.

Figure 3:
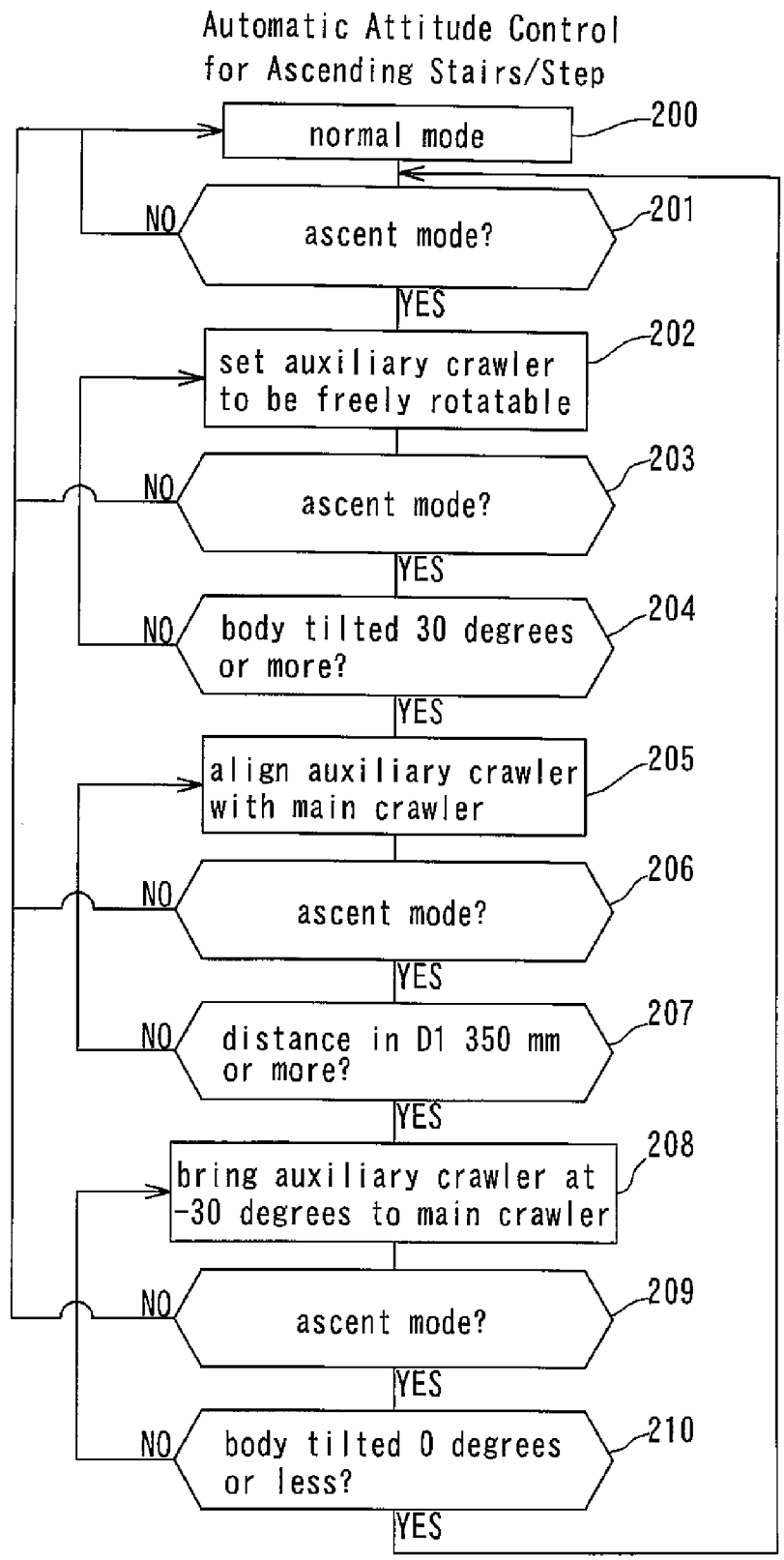
FIG. 3 is a flow chart of an automatic attitude control of an auxiliary crawler when the crawler device ascends stairs or a step.

In response to the selection of the ascent mode, the controller 65 executes an automatic attitude control for the ascent mode as shown in FIG. 3. In this embodiment, during the execution of this control, forward speed of the main crawler 20 is controlled by the remote control.

While the control is executed in the normal mode (Step 200), a judgment is made whether the control is switched to the ascent mode (Step 201) and if the judgment is affirmative in Step 201, the auxiliary crawler 30 is set to be freely rotatable (Step 202).

Figure 4B:
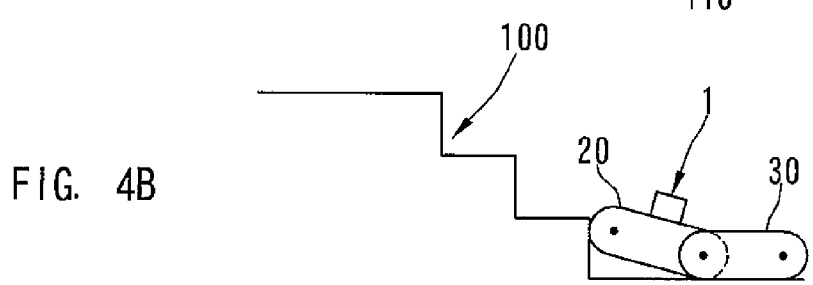
FIG. 4B is a schematic side view of the crawler device in a next state following the one depicted in FIG. 4A.

As shown in FIG. 4A, when the crawler device is moving forward toward the stairs 100, a front end portion of the main crawler 20 hits against a riser of the first stair of the stairs 100, and starts ascending along the riser as shown in FIG. 4B. As a result, a tilt angle in the front-rear direction of the device body 1 including the main crawler 20 is increased. The auxiliary crawler 30, being free with respect to the main crawler 20, continues to move forward kept in contact with the road surface 110.

Figure 4C:
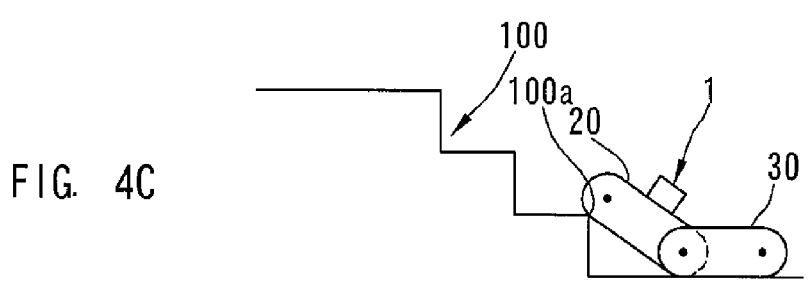
FIG. 4C is a schematic side view of the crawler device in a next state following the one depicted in FIG. 4B.

Since the main crawler 20 is small in length, as mentioned above the main crawler 20 can ascend a step relatively with ease even when the stair is higher than a diameter of its sprocket, and can ride on the nosing 100a of the first stair as shown in FIG. 4C. The tilt angle of the main crawler is great because of the small length thereof.

Following Step 202 described above, a judgment is made whether the ascent mode is maintained (Step 203). If the judgment is affirmative in Step 203, a judgment is made whether a tilt angle of the base 10 in the front-rear direction as detected by the tilt sensor 60 reaches or exceeds a first threshold angle (Step 204). The first threshold angle is set at an angle smaller than a tilt angle at which the device body 1 topples backward. In this embodiment, the first threshold angle is set at 30 degrees.

Figure 4D:
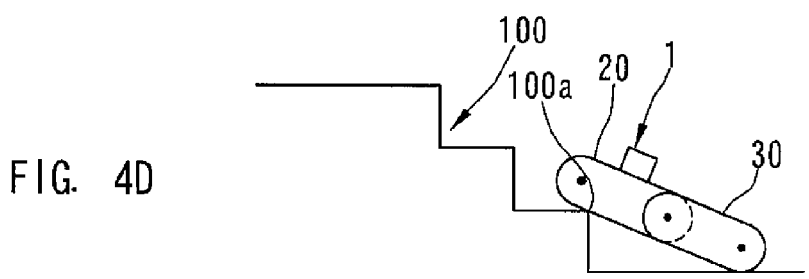
FIG. 4D is a schematic side view of the crawler device in a next state following the one depicted in FIG. 4C.

If the judgment is negative in Step 204, Steps 202, 203 and 204 are repeated. When the tilt angle of the base 10 in the front-rear direction reaches a first threshold angle, in other words becomes 30 degrees, an affirmative judgment is made in Step 204, and the flow proceeds to Step 205. In Step 205, the rotation motor 50 is controlled to rotate the auxiliary crawler 30 downward with respect to the main crawler 20 until the angle of the auxiliary crawler 30 with respect to the main crawler 20 becomes 0 degrees with the auxiliary crawler 30 in alignment with the main crawler 20 as shown in FIG. 4D. Usually, the auxiliary crawler 30 is rotated while the crawler device is running forward.

In Step 205 described above, the auxiliary crawler 30 does not have to be strictly in alignment with the main crawler 20. It is acceptable as long as the angle of the auxiliary crawler 30 with respect to the main crawler 20 is within an angular range of from −10 degrees to +10 degrees, where the crawlers are in near alignment with each other. In this angular range, the overall length of the crawler device is just slightly shorter than the maximum overall length L0 thereof.

The execution of Step 205 reduces the tilt angle of the device body 1 as shown in FIG. 4D, thereby preventing the crawler device from toppling backward. When the forward speed of the crawler device relative to a rotation speed of the auxiliary crawler 30 is greater than in this embodiment, the tilt angle of the device body 1 is hardly reduced, remaining at 30 degrees or in some cases possibly at an angle slightly greater than 30 degrees. Even in such cases, the tilt angle can be restrained to a range in which the crawler device does not topple backward.

Figure 4E:
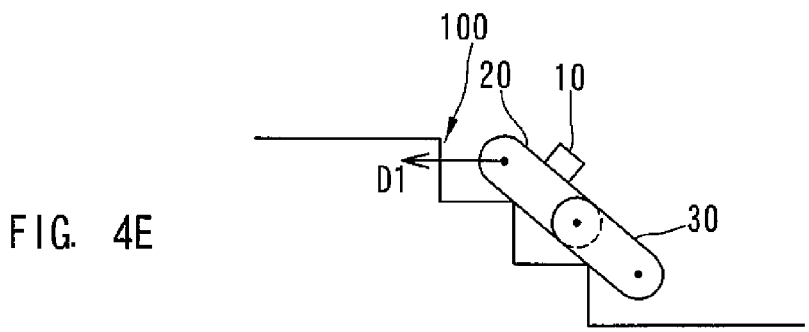
FIG. 4E is a schematic side view of the crawler device in a next state following the one depicted in FIG. 4D.

As mentioned above, the crawler device ascends the stairs 100 with the auxiliary crawler 30 maintained in alignment with the main crawler 20. At this time, as shown in FIG. 4E, the auxiliary crawler 30 as well as the main crawler 20 is riding on the stairs 100. As a result, the crawler device rides on at least two of the stair nosings 100a (two or three stair nosings), allowing the crawler device to ascend the stairs in a stable and steady manner.

Following Step 205, a judgment is made again whether the ascent mode is maintained (Step 206). If the judgment is affirmative, the flow proceeds to Step 207, where a judgment is made whether the distance measured by the first distance sensor 61 is equal to or greater than a threshold distance of, for example 350 mm. As shown in FIG. 4E, when the crawler device is ascending the stairs, the distance measured by the first distance sensor 61 is small because the stairs 100 exists in the direction of measurement D1. Thus a negative judgment is made in Step 207.

If the judgment is negative in Step 207, Steps 205, 206 and 207 are repeated, with the auxiliary crawler 30 maintained in alignment with the main crawler 20.

Figure 4F:
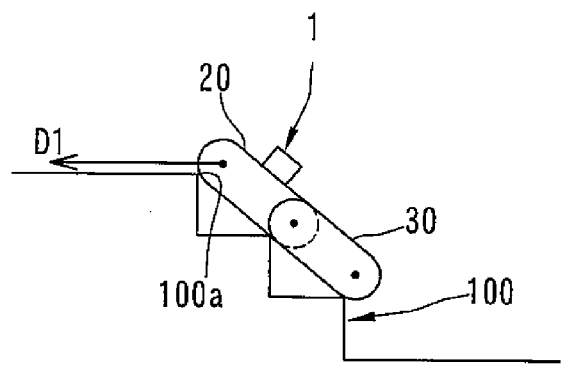
FIG. 4F is a schematic side view of the crawler device in a next state following the one depicted in FIG. 4E.

As the crawler device ascends further and approaches an upper end of the stairs 100, the stairs 100 comes not to be caught in the direction of measurement D1 of the first distance sensor 61 as shown in FIG. 4F. This results in the increase in a distance measured with the distance sensor 61. At this time, a positive judgment is made in Step 207, and the flow proceeds to Step 208. In Step 208, the auxiliary crawler 30 is rotated downward with respect to the main crawler 20 to be located below the axis L of the main crawler 20 until the angle of the auxiliary crawler 30 with respect to the main crawler 20 becomes −30 degrees, for example. The angle of the auxiliary crawler 30 with respect to the main crawler 20 can be set at any angle within a range of from −20 degrees to −45 degree.

Figure 4G:
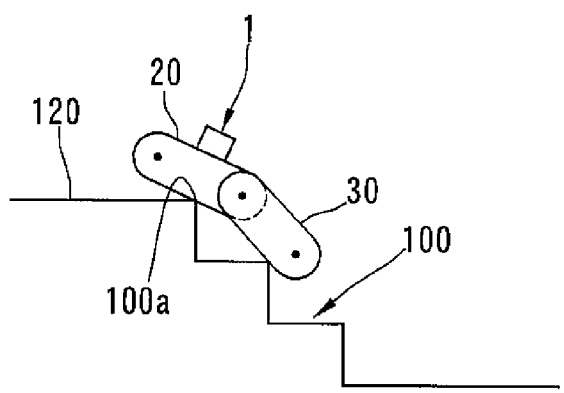
FIG. 4G is a schematic side view of the crawler device in a next state following the one depicted in FIG. 4F.
Figure 4H:
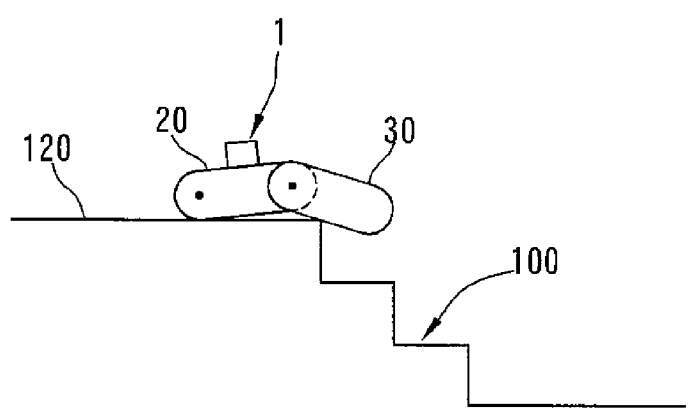
FIG. 4H is a schematic side view of the crawler device in a next state following the one depicted in FIG. 4G.
Figure 4I:
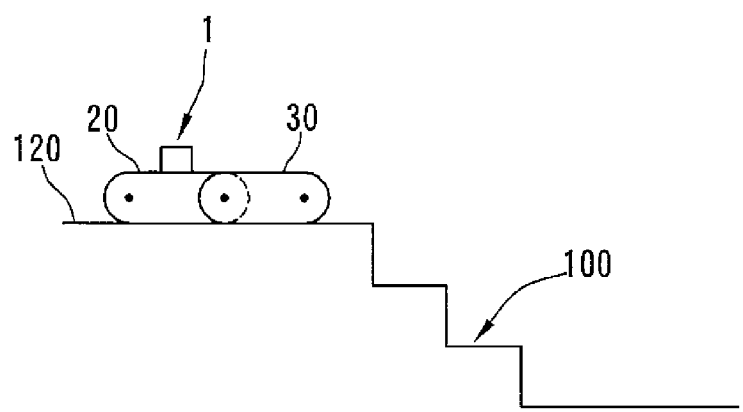
FIG. 4I is a schematic side view of the crawler device in a next state following the one depicted in FIG. 4H.

As shown in FIG. 4G, the rotation of the auxiliary crawler 30 results in decrease in the tilt angle of the device body 1 with respect to the upper road surface 120. After that, when a center of gravity of the crawler device passes the nosing 100a of the highest stair, the crawler device is rotated forward about the stair nosing 100a until the main crawler 20 lands on the upper road surface 120 to assume an attitude as shown in FIG. 4H. At this time, the impact is alleviated since the tilt angle of the device body 1 is set to be smaller than the inclination of the stairs 100.

Following the execution of Step 208, a judgment is made again whether the ascent mode is maintained (Step 209). If the judgment is affirmative, the flow proceeds to Step 210, where a judgment is made whether the tilt angle of the device body 1 is 0 degrees or smaller. This means a judgment is made about whether the crawler device has tilted downward toward the front and the main crawler 20 has landed on the upper road surface 120.

The threshold angle in Step 210 does not have to be 0 degrees, but can be set at any angle within a range of from +10 degrees to −10 degrees, where "+" means a tilt of the device body 1 upward toward the front and "−" means a tilt of the device body 1 downward toward the front.

If the judgment is negative in Step 210, Steps 208, 209 and 210 are repeated, with the auxiliary crawler 30 maintained in the angled position with respect to the main crawler 20.

If the judgment is affirmative in Step 210, the flow returns to Step 201. Until a negative judgment is made in Step 201 (i.e. until the crawler device is released from the ascent mode), Step 202 is executed to maintain the auxiliary crawler 30 in a preparatory state, i.e. freely rotatable.

If the judgment is negative in Steps 203, 206 or 209, i.e., the crawler device is released from the ascent mode by the operator with the remote controller, the flow returns to Step 200 to the control in the normal mode in the same manner as when the judgment is negative in Step 201.

If the judgment is affirmative in Step 210, the auxiliary crawler 30 may be rotated to be in alignment with the main crawler 20.

Steps 206 to 209 may be skipped. In this case, the crawler device is rotated forward about the stair nosing 100a with the auxiliary crawler 30 maintained in alignment with the main crawler 20. In this case, a judgment is made in Step 210 whether the tilt angle of the device body 1 is in a range of from +10 degrees to −10 degrees. If the road surface 120 is a downward slope, the crawler device, upon landing on the upper road surface 120, tilts downward toward the front with the tilt angle of the base 10 becoming smaller than −10 degrees, and as a result, a negative judgment is made in Step 210. As a result, the flow returns to step 205, and the auxiliary crawler 30 is maintained in alignment with the main crawler 20, thereby preventing the crawler device from toppling forward.

Figure 5A:
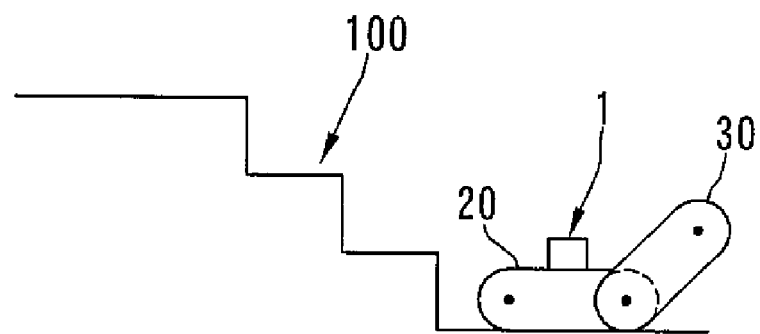
FIG. 5A, which corresponds to FIG. 4A, shows another embodiment of the automatic attitude control of the auxiliary crawler when the crawler device ascends stairs or a step.
Figure 5B:
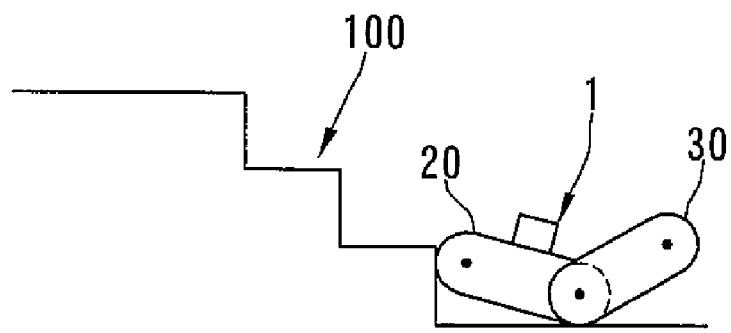
FIG. 5B, which corresponds to FIG. 4B, is a schematic side view of the crawler device in a next state following the one depicted in FIG. 5A.
Figure 5C:
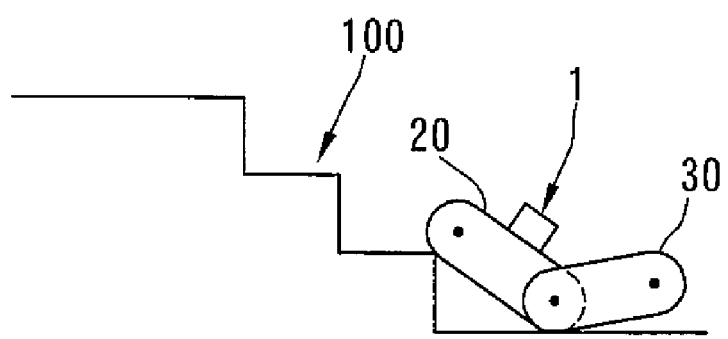
FIG. 5C, which corresponds to FIG. 4C, is a schematic side view of the crawler device in a next state following the one depicted in FIG. 5B.

When the ascent mode is selected, in Step 202, instead of setting the auxiliary crawler 30 free, the auxiliary crawler 30 may be rotated upward and maintained at a predetermined angle with respect to the line extending longitudinally from the main crawler 20 (raised or lifted state). The angle may be set at any angle within a range from 20 to 60 degrees. In this case, the auxiliary crawler 30 assumes the attitudes as shown in FIGS. 5A, 5B and 5C, instead of FIGS. 4A, 4B and 4C.

Operation of the crawler device when descending the stairs 100 will now be described with reference to FIGS. 6 and 7. An operator makes the crawler device go forward observing the images from the video camera 13. When the crawler device approaches stairs 100 as shown in FIG. 7A, an descent mode for descending a step or stairs should be selected with the remote controller.

A judgment is made in the controller 65 whether the descent mode is selected (Step 220). If the judgment is affirmative, the flow proceeds to Step 221, where a judgment is made whether a distance measured by the first distance sensor 61 is equal to or greater than a threshold distance of, for example 200 mm and whether a distance measured by the second distance sensor 62 is equal to or greater than a threshold distance of, for example 300 mm.

Figure 7A:
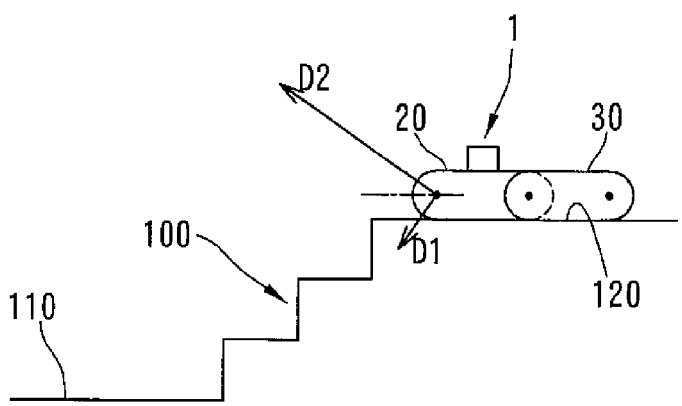
FIG. 7A is a schematic side view of the crawler device in an initial state in the control of FIG. 6.

As shown in FIG. 7A, when the crawler device is running on the upper road surface 120, a distance to the road surface 120 is measured by the first distance sensor 61. Therefore, a negative judgment is made in Step 221.

Figure 7B:
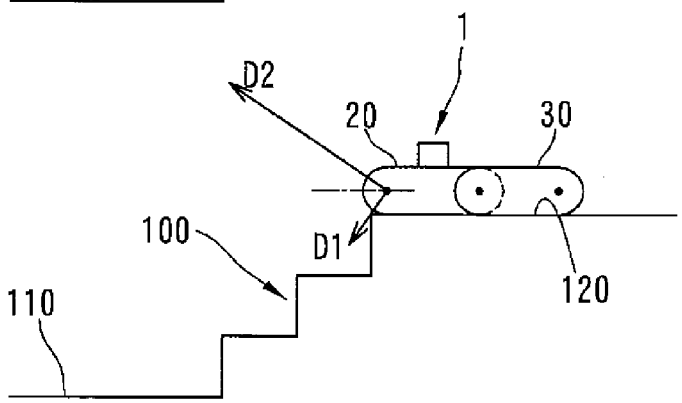
FIG. 7B is a schematic side view of the crawler device in a next state following the one depicted in FIG. 7A.

As the crawler device further proceeds towards the stairs 100, the direction of measurement D1 of the first distance sensor 61 is shifted away from the upper road surface 120 as shown in FIG. 7B, and the distance sensor 61 comes to measure a distance to a going of the highest stair of the stairs 100. At this time, the measured distance is equal to or greater than 200 mm.

At the same time, a distance measured by the second distance sensor 62 is monitored in case there is a dead end with a wall or something immediately near the stairs or step. If the distance measured by the distance sensor 62 is less than 300 mm, a judgment is made that there is a dead end, and accordingly a negative judgment is made in Step 221. In this case, the attitude control in the descent mode is not executed.

If a judgment is made that there is a dead end in Step 221 based on the distance measured by the distance sensor 62, the crawler device may be forcibly prohibited from proceeding forward.

The judgment based on the distance measured by the distance sensor 62 may be omitted in Step 221.

In Step 221, instead of judging whether the distance measured by the distance sensor 61 is equal to or greater than 200 mm, a judgment may be made whether the measured distance falls within a range of from 200 to 500 mm. If the distance exceeds 500 mm, a judgment is made that there is a cliff, not the stairs 100, and the subsequent steps are not executed. In this case, the crawler device may be forcibly prohibited from proceeding forward.

Figure 7C:
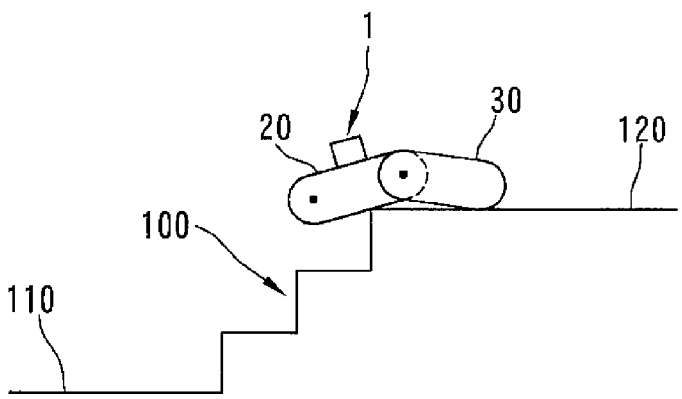
FIG. 7C is a schematic side view of the crawler device in a next state following the one depicted in FIG. 7B.

If the crawler device is in a position as shown in FIG. 7B and there is no wall surface in front of it, an affirmative judgment is made in Step 221. The flow proceeds to Step 222, where the auxiliary crawler 30 is rotated downward with respect to the main crawler 20 to be positioned below the axis L of the main crawler 20, for example at an angle of −30 degrees. As a result, the device body 1 tilts downward toward the front as shown in FIG. 7C.

In Step 222, the position of the auxiliary crawler 30 can be set at any angle within an angular range of from −20 to −45 degrees with respect to the main crawler 20.

Figure 7D:
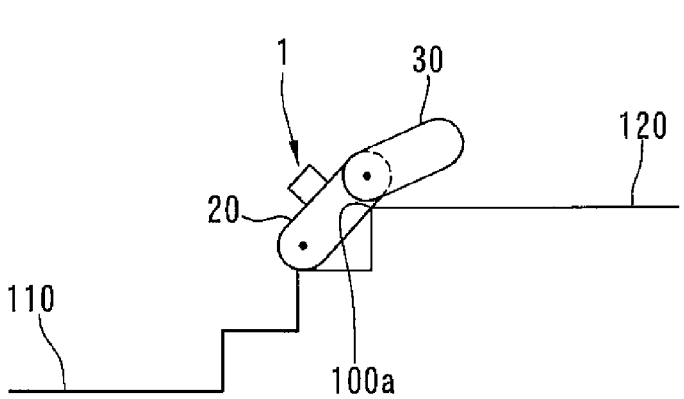
FIG. 7D is a schematic side view of the crawler device in a next state following the one depicted in FIG. 7C.

The degree of tilt of the device body 1 increases as the crawler device proceeds forward. When the center of gravity of the crawler device passes the nosing 100a of the highest stair, the crawler device is rotated about the stair nosing 100a until the front end portion of the main crawler 20 lands on the going of the highest stair of the stairs 100 as shown in FIG. 7D. At this time, since the device body has been tilted downward toward the front, as mentioned above, when the crawler device is rotated, the rotation angle of the crawler device can be restrained and thus the impact can be alleviated.

Following Step 222, a judgment is made whether the descent mode is maintained (Step 223). If the judgment is affirmative, the flow proceeds to Step 224, where a judgment is made whether the tilt angle of the device body 1 is equal to or smaller than a threshold angle of, for example −40 degrees. After the crawler device is rotated about the nosing 100a of the highest stair as shown in FIG. 7D, the tilt angle is or below −40 degree, and an affirmative judgment is made.

If the judgment is negative in Step 224, i.e. the crawler device is judged not to be rotated, Steps 222, 223, and 224 are repeated to maintain the tilt angle of the auxiliary crawler 30 at −30 degrees.

Figure 7E:
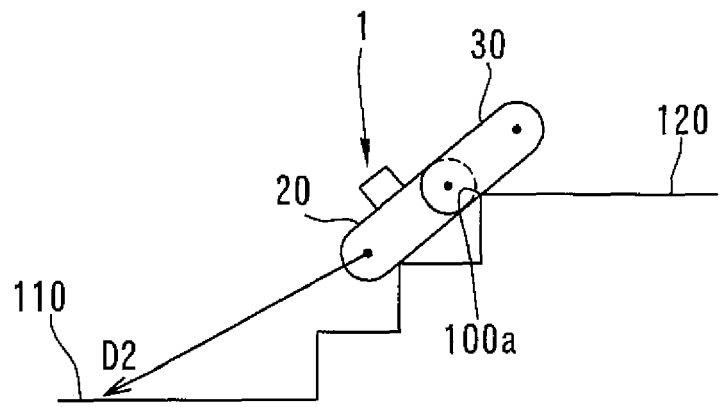
FIG. 7E is a schematic side view of the crawler device in a next state following the one depicted in FIG. 7D.

If the judgment is affirmative in step 224, the flow proceeds to Step 225, where the auxiliary crawler 30 is aligned with the main crawler 20 as shown in FIG. 7E. In Step 225 described above, the angle of the auxiliary crawler 30 with respect to the main crawler 20 can be set at any angle within a range of from −10 degrees to +10 degrees. Since the main crawler 20 and the auxiliary crawler 30 are in alignment with each other, the crawler device can descend the stairs 100 in a stable manner.

Following Step 225, a judgment is made again whether the descent mode is maintained (Step 226). If the judgment is affirmative, a judgment is made whether the distance measured by the second distance sensor 62 is equal to or smaller than a threshold distance of, for example 400 mm (Step 227).

Figure 7F:
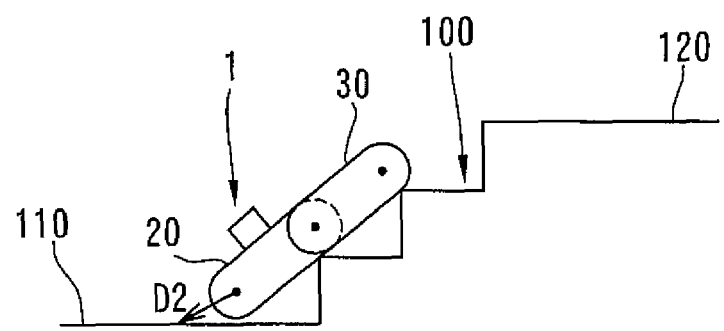
FIG. 7F is a schematic side view of the crawler device in a next state following the one depicted in FIG. 7E.
Figure 7G:
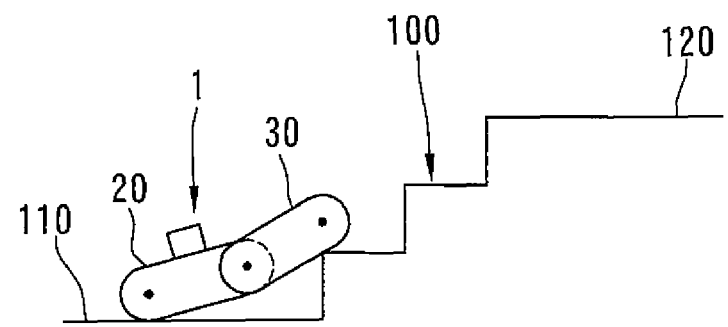
FIG. 7G is a schematic side view of the crawler device in a next state following the one depicted in FIG. 7F.
Figure 7H:
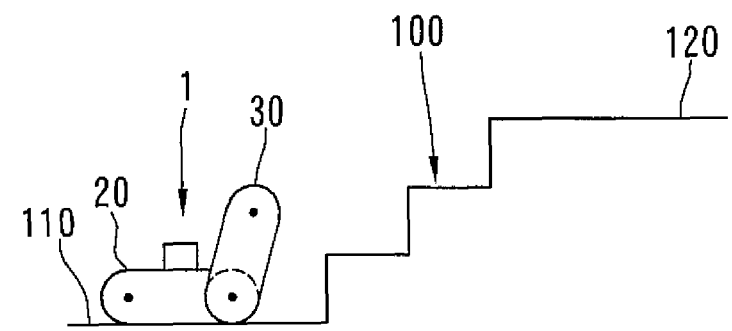
FIG. 7H is a schematic side view of the crawler device in a next state following the one depicted in FIG. 7G.

The distance measured by the second distance sensor 62 becomes the smallest when the front end portion of the main crawler 20 hits the lower road surface 110. The threshold distance 400 mm is slightly longer than a minimum measured distance. Therefore, in Step 227, an affirmative judgment is made immediately before the main crawler 20 hits the lower road surface 110 as shown in FIG. 7F.

If the judgment is affirmative in Step 227, the auxiliary crawler 30 is set at +75 degrees with respect to the main crawler 20. Since the auxiliary crawler 30 is rotated slowly as the crawler device proceeds, the main crawler 20 can land on the road surface 110 softly. This alleviates the impact to the device body 1 (refer to FIGS. 7G and 7H).

Figure 6:
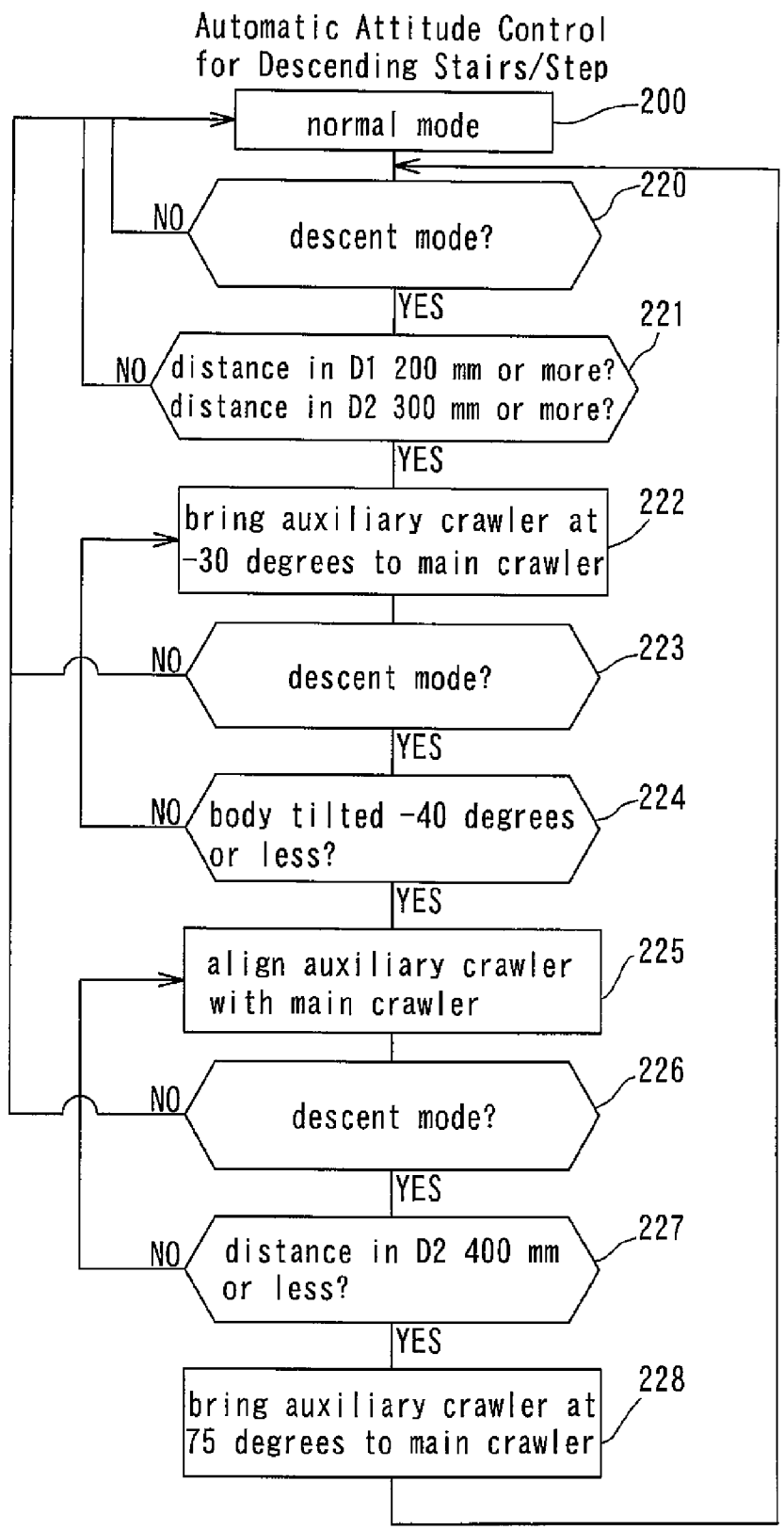
FIG. 6 is a flow chart of an automatic attitude control of the auxiliary crawler when the crawler device descends stairs or a step.
Figure 8:
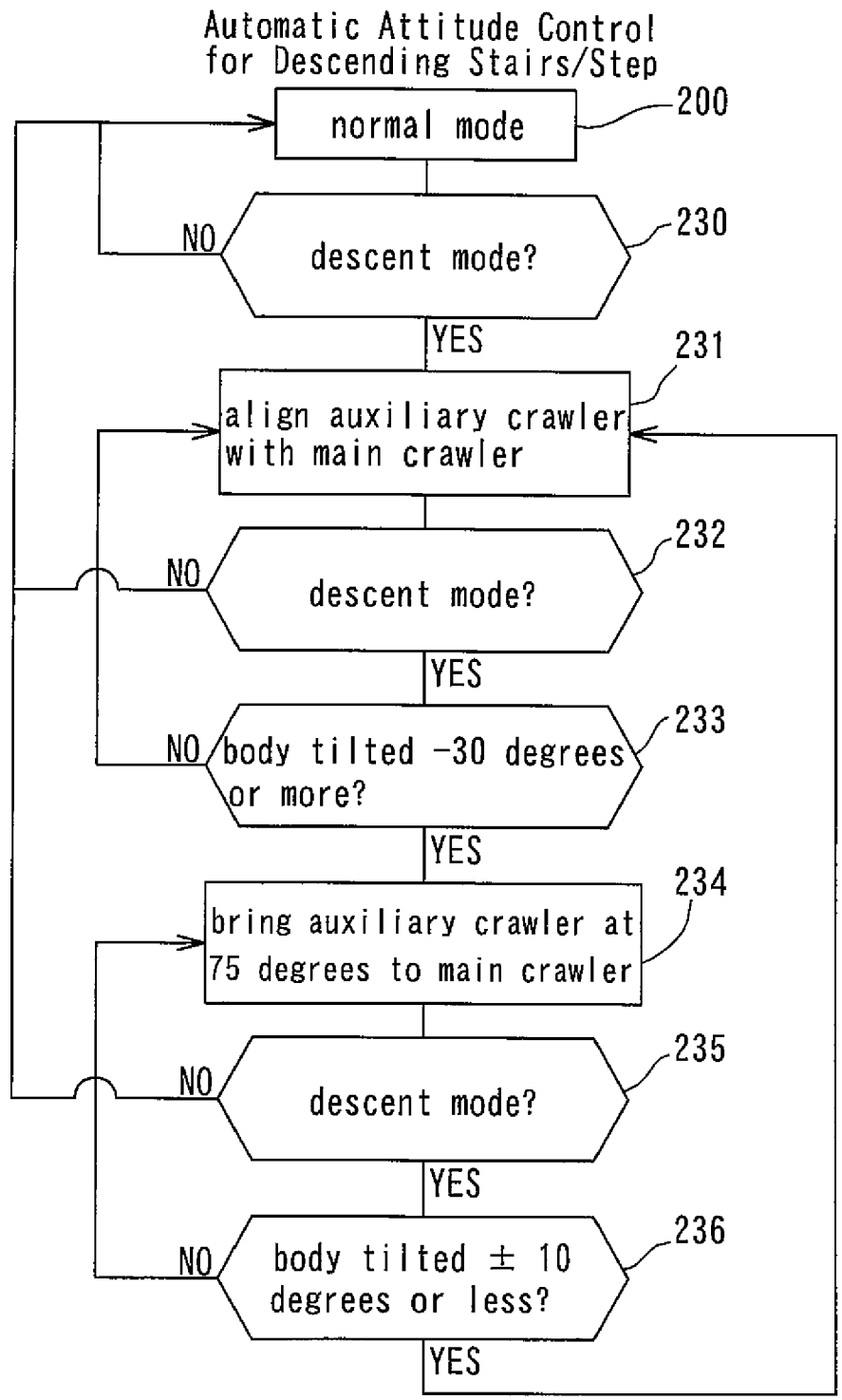
FIG. 8 is a flow chart of the automatic attitude control, according to another embodiment, of the auxiliary crawler when the crawler device descends stairs or a step.

In an embodiment shown in FIG. 6, the distance sensors 61, 62 are used for controlling in the descent mode. Alternatively, the descent mode can be executed using only the tilt sensor 60 as shown in FIG. 8. Details are given below.

While the control is executed in the normal mode (Step 200), a judgment is made whether the control is switched to the descent mode (Step 230). If the judgment is affirmative, the following control will be executed.

First, the auxiliary crawler 30 is set to be at 0 degrees with respect to the line extending longitudinally from the main crawler 20 and maintained in alignment with the main crawler 20 (Step 231). The angle of the auxiliary crawler 30 with respect to the main crawler 20 can be set at any angle within a range of from −10 degrees to +10 degrees.

As the crawler device proceeds towards the stairs 100, the center of gravity of the crawler device passes the nosing 100a of the highest stair. At this time, the crawler device is in a similar state to the one shown in FIG. 7E. The crawler device further descends the stairs 100, tilted at an angle corresponding to the inclination of the stairs 100.

Following Step 231, a judgment is made again whether the descent mode is selected (Step 232). If the judgment is affirmative, a judgment is made whether the tilt angle of the device body 1 is equal to or greater than a threshold angle of, for example −30 degrees (Step 233). This threshold angle is slightly gentler than the inclination of the stairs 100.

If the judgment is negative in Step 233, Steps 231, 232, and 233 are repeated.

Then the front end portion of the main crawler 20 proceeds past the nosing 100a of the lowest stair and hits the lower road surface 110. As the crawler device further proceeds forward, the auxiliary crawler 30 rides on the nosing 100a of the lowest stair. The tilt angle of the device body 1 became gentler to be −30 degree or greater, whereupon an affirmative judgment is made in Step 233. The flow proceeds to Step 234, where the rotation motor 50 is controlled to rotate the auxiliary crawler 30 upward with respect to the main crawler 20 until the angle of the auxiliary crawler 30 with respect to the main crawler 20 becomes 75 degrees. This enables the device body 1 to land on the road surface 110 softly.

Following Step 234, a judgment is made again whether the descent mode is maintained (Step 235). If the judgment is affirmative, the flow proceeds to Step 236, where a judgment is made whether the tilt angle of the base 10 falls within a range of −10 to +10 degrees. If the judgment is negative in Step 236, Steps 234, 235, and 236 are repeated.

If the judgment is affirmative in Step 236, the flow returns to Step 231, where the auxiliary crawler 30 is made to be aligned with the main crawler 20 again.

If the judgments are negative in Steps 232 and 235, i.e. the crawler device is released from the descent mode with the remote controller, the flow returns to Step 200 in the same manner as when the judgment is negative in Step 230, and the control is executed in the normal mode.

When the judgment is affirmative in Step 236 of the descent mode, the auxiliary crawler 30 may be maintained in a rotated higher position or the auxiliary crawler 30 may be freely rotatable.

Although the description of the automatic attitude control given above is about when the crawler device ascends and descends the stairs, the automatic attitude control may also be executed when the crawler device rides over a step.

Figure 9:
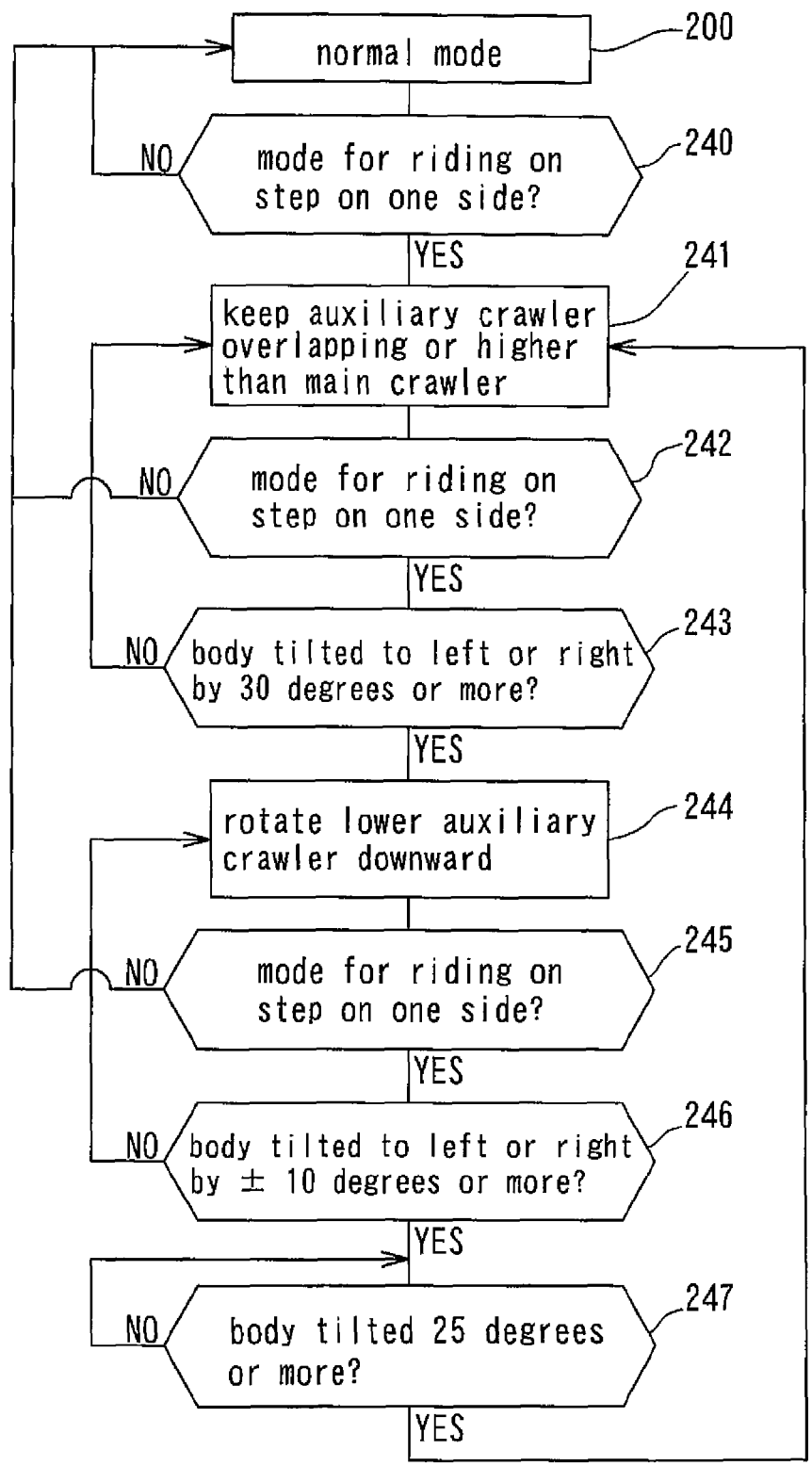
FIG. 9 is a flow chart of an automatic attitude control of the auxiliary crawler when the crawler device rides on a step on one side only, either on the left or right.

The automatic attitude control of the crawler device when riding on a step on one side will be described now referring to FIGS. 9 to 11.

While the control is executed in the normal mode (Step 200), a judgment is made whether the control is switched to a mode for riding on step on one side (Step 240). If the judgment is affirmative, the following control will be executed.

Figure 10A:
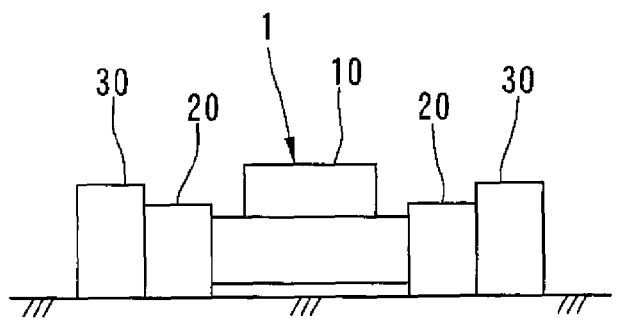
FIG. 10A is a front view of the crawler device before riding on the step on one side only.
Figure 10B:
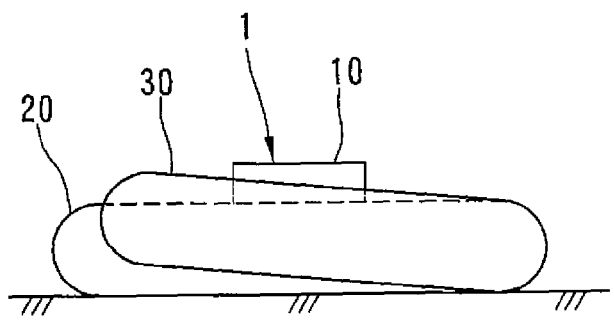
FIG. 10B is a side view of the crawler device before riding on the step on one side only.

First, the auxiliary crawler 30 is maintained in a position overlapping the main crawler 20 or a rotated higher position (specifically, at a slightly lifted angular position) as shown in FIGS. 10A and 10B (Step 241).

Following Step 241, a judgment is made again whether the mode for riding on step on one side is maintained (Step 242). If the judgment is affirmative, a judgment is made whether the tilt angle of the device body 1 in the left-right direction reaches or exceeds a threshold angle of, for example 30 degrees (Step 243). This threshold angle is set at an angle smaller than the tilt angle at which the device body is overturned sideways.

If the judgment is negative in Step 243, Steps 241, 242, and 243 are repeated.

Figure 11A:
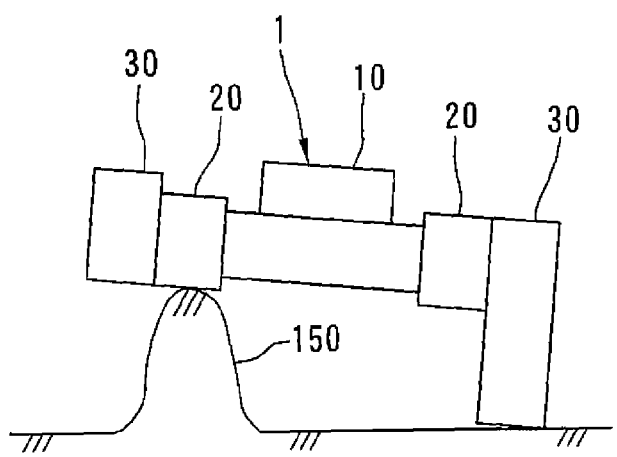
FIG. 11A is a front view of the crawler device riding on the step on one side only.
Figure 11B:
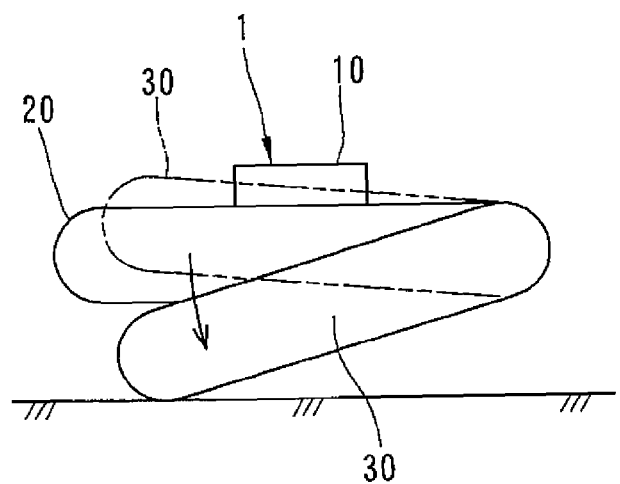
FIG. 11B is a side view of the crawler device riding on the step on one side only.

In the crawler device proceeding toward a local step 150 in the attitude shown in FIGS. 10A and 10B, when one of the main crawlers 20 either in the right or left rides on the step 150 as shown in FIGS. 11A and 11B, the base 10 is tilted in the left-right direction.

If the tilt angle of the base 10 in the left-right direction as detected by the tilt sensor 60 reaches or exceeds 30 degrees, an affirmative judgment is made in Step 243. The flow proceeds to Step 244, where only the auxiliary crawler 30 on the side opposite to the main crawler 20 that is riding on the step 150 is rotated downward with respect to the corresponding main crawler 20 until the angle of the auxiliary crawler 30 with respect to the corresponding main crawler 20 reaches a predetermined angle as shown in FIGS. 11A and 11B. The predetermined angle is set at an angle in a range of −30 to −45 degrees (here, "minus" means a direction below the main crawler 20).

Execution of Step 244 reduces the tilt angle of the device body 1 as shown in FIG. 11A, thus preventing the crawler device from being overturned sideways.

Following Step 244, a judgment is made again whether the mode for riding on step on one side is maintained (Step 245). If the judgment is affirmative, the flow proceeds to Step 246, where a judgment is made whether the tilt angle of the device body 1 falls within a predetermined angular range. The predetermined angular range is set at a range of −10 to +10 degrees, for example, where "plus" means the device body 1 is tilted upward toward left and "minus" means the device body 1 is tilted upward toward right.

If the judgment is negative in Step 246, Steps 244, 245 and 246 are repeated.

If the judgment is affirmative in Step 246, the flow proceeds to Step 247, where a judgment is made whether the device body 1 tilts 25 degrees or more in a direction opposite to the direction of the tilt judged in Step 243. This judgment means a judgment whether the crawler device has ridden over the step. This is because after the crawler device has ridden over the step, a side of the device body 1 nearer to the auxiliary crawler 30 that was rotated downward in Step 244 becomes higher than the other side thereof.

If the judgment is negative in Step 247, the auxiliary crawler 30 is maintained in a rotated down condition. If the judgment is affirmative in Step 247, the flow goes back to Step 241, and the auxiliary crawler 30 returns to the originally assumed preparatory state.

If the judgments are negative in Steps 242 and 245, i.e. when the crawler device is released from the control in the mode for riding on step on one side using the remote controller, the flow returns to Step 200 as when the negative judgment is made in Step 240, and the control is executed in the normal mode.

Figure 12:
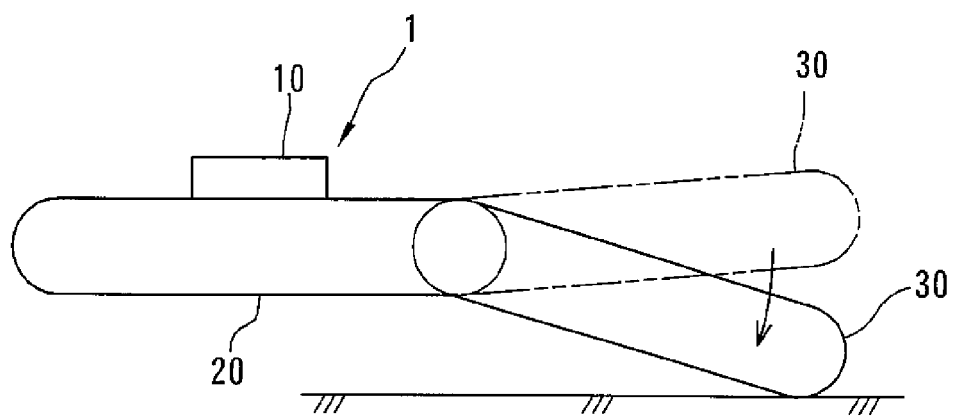
FIG. 12, which corresponds to FIG. 11B, shows another embodiment of the control of the auxiliary crawler when the crawler device rides on the step on one side only.

In Step 241 of the mode for riding on step on one side, the auxiliary crawler 30 may be rotated to and maintained in a position slightly above the line extending longitudinally from the main crawler 20 (slightly lifted or raised position) behind the main crawler 20 as shown in FIG. 12. In this case, the auxiliary crawler 30 is rotated downward in Step 244 when the crawler device is riding on a step on one side thereof.

In Step 241 the auxiliary crawler 30 may be freely rotatable with respect to the main crawler 20.

Figure 13:
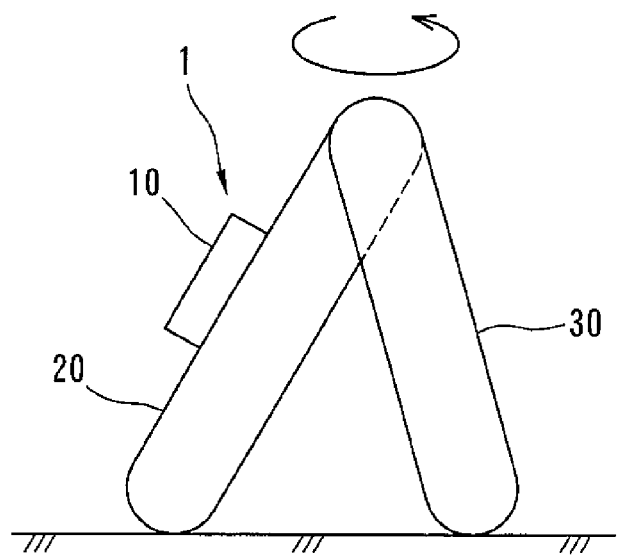
FIG. 13 is a schematic side view of the crawler device making pivot turns.

The crawler device according to this embodiment can be made to make pivot turns (turn at the same place) with the remote controller, with the auxiliary crawler 30 rotated downward as shown in FIG. 13, the main crawler 20 and the auxiliary crawler 30 positioned at an acute angle with respect to each other and only end portions of the main crawler 20 and the auxiliary crawler 30 contacting the road surface. During the pivot turns, the main crawlers 20 in the left and right are rotated in the opposite directions.

Figure 15:
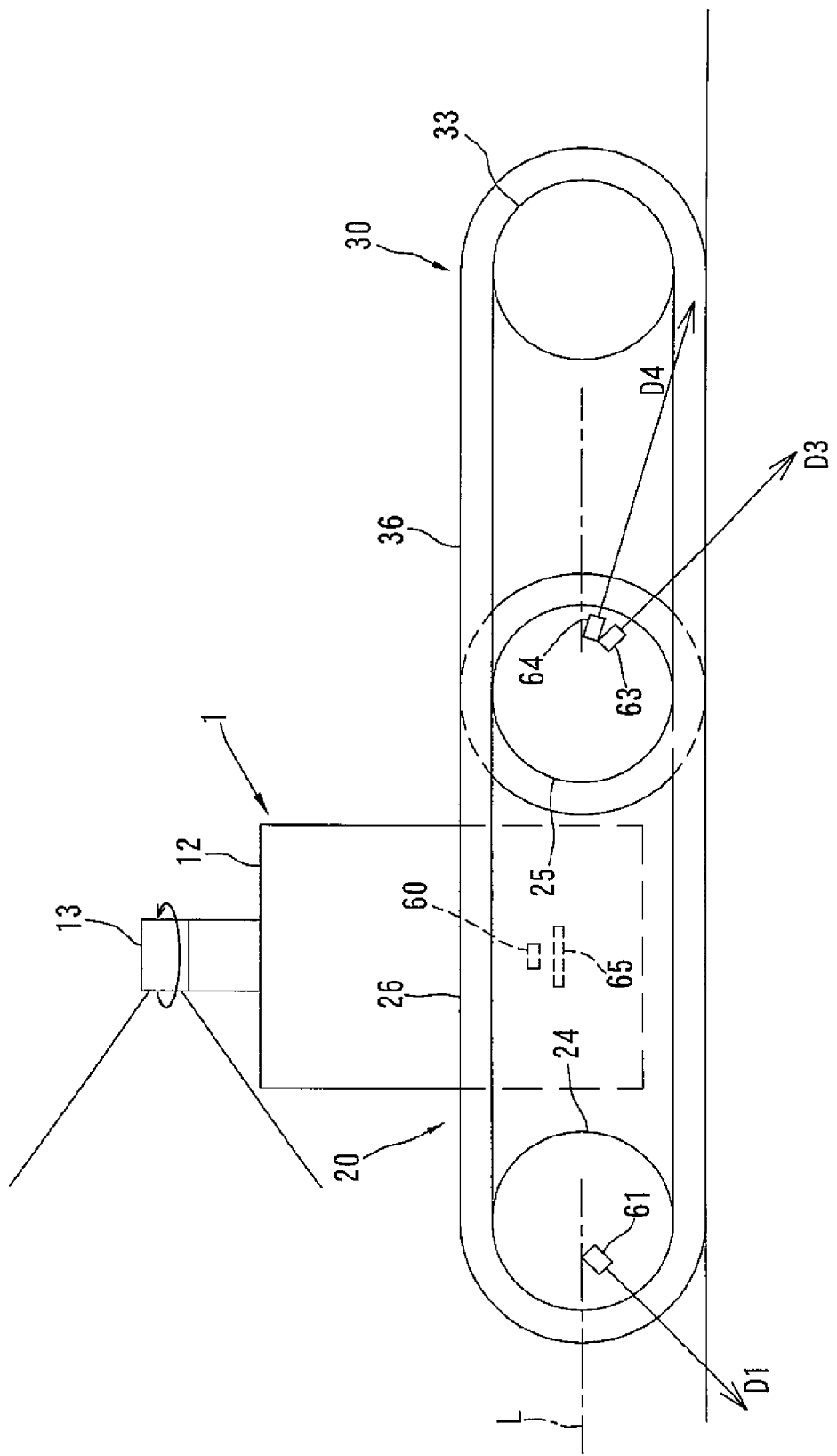
FIG. 15 is a side view of a crawler device according to a second embodiment of the present invention.
Figure 16:
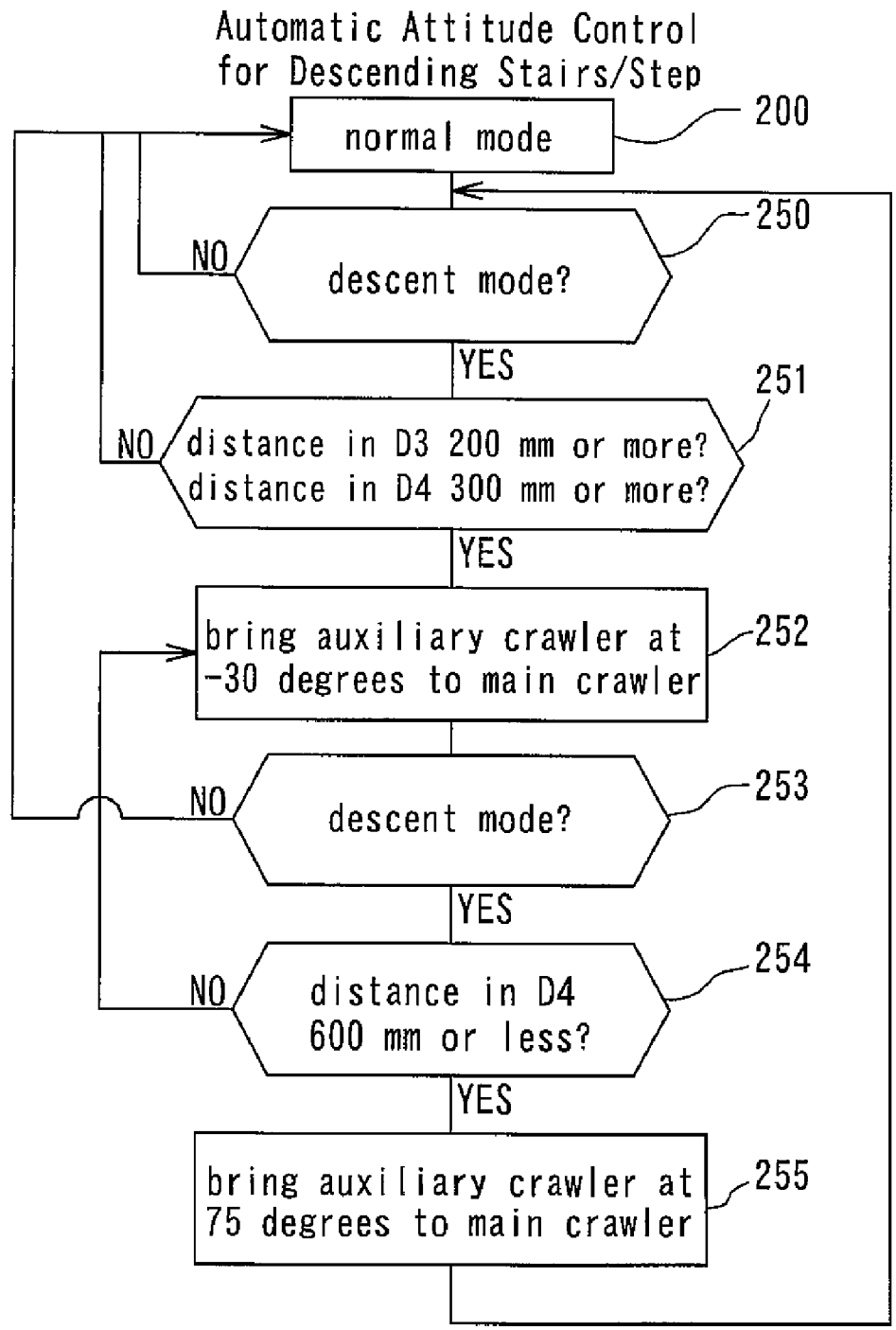
FIG. 16 is a flow chart of an automatic attitude control of an auxiliary crawler when the crawler device according to the second embodiment descends stairs.

A second embodiment of the present invention will now be described with reference to FIGS. 15 to 17. In this embodiment, the video camera 13 can be rotated, to be directed forward and rearward. The same distance sensor 61 as the one used in the first embodiment is disposed in the front end portion of the device body 1 and two distance sensors 63, 64 are disposed in the rear end portion of the device body 1.

The distance sensors 63, 64 measure distances to an object located below and behind thereof. Directions of measurement of the distance sensors 63, 64 are indicated by reference numerals D3 and D4 in FIG. 15. The direction of measurement D3 is at −45 degrees, for example, and the direction of measurement D4 is at −15 degrees, for example, with respect to the axis L.

In the second embodiment, the attitude of the crawler device is controlled in the similar manner as in the first embodiment in an ascent mode. However, in a descent mode, a control is executed with the main crawler 20 moved backward, i.e. with the auxiliary crawler 20 placed in front. The details are given below referring to FIGS. 16 and 17.

First, judgment is made whether the descent mode is selected (Step 250). If the judgment is affirmative, the flow proceeds to Step 251, where a judgment is made whether a distance measured by the distance sensor 63 is equal to or greater than a threshold distance of, for example 200 mm and whether a distance measured by the distance sensor 64 is equal to or greater than a threshold distance of, for example 300 mm.

Figure 17A:
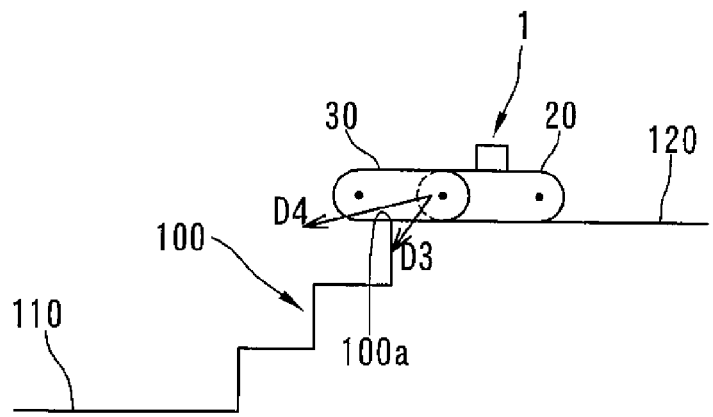
FIG. 17A is a schematic side view of the crawler device in an initial state in the control of FIG. 16.

As shown in FIG. 17A, when the crawler device is running on the upper road surface 120 with the auxiliary crawler 30 freely rotatable or maintained in alignment with respect to the main crawler 20, a negative judgment is made in Step 251 even when the main crawler 20 approaches the stairs 100. This is because a distance to the road surface is measured by the distance sensor 63.

Figure 17B:
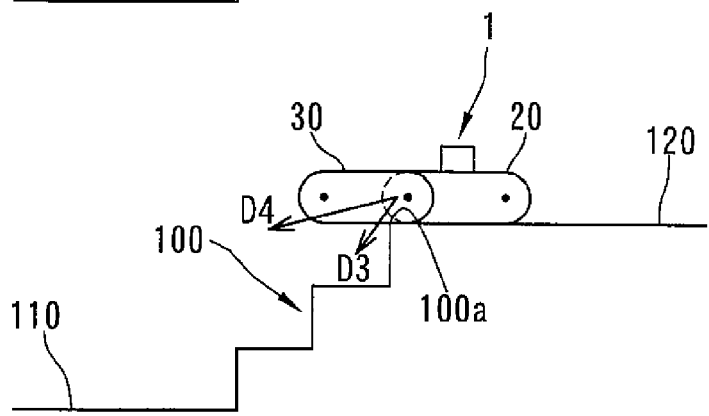
FIG. 17B is a schematic side view of the crawler device in a next state following the one depicted in FIG. 17A.
Figure 17C:
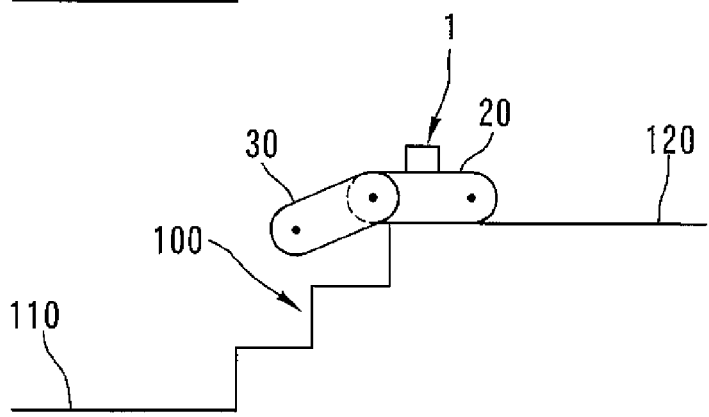
FIG. 17C is a schematic side view of the crawler device in a next state following the one depicted in FIG. 17B.
Figure 17D:
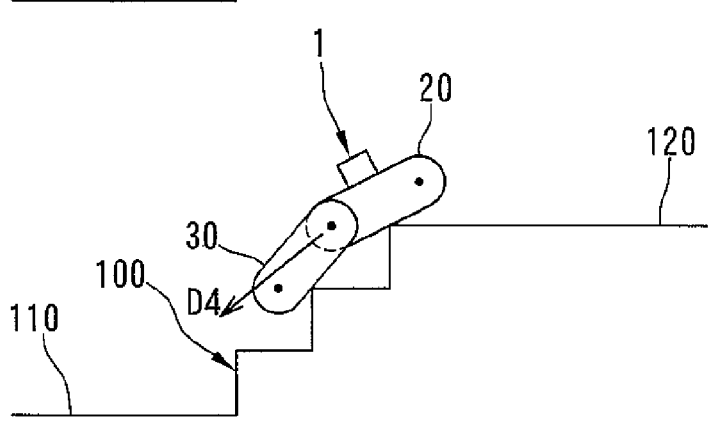
FIG. 17D is a schematic side view of the crawler device in a next state following the one depicted in FIG. 17C.
Figure 17E:
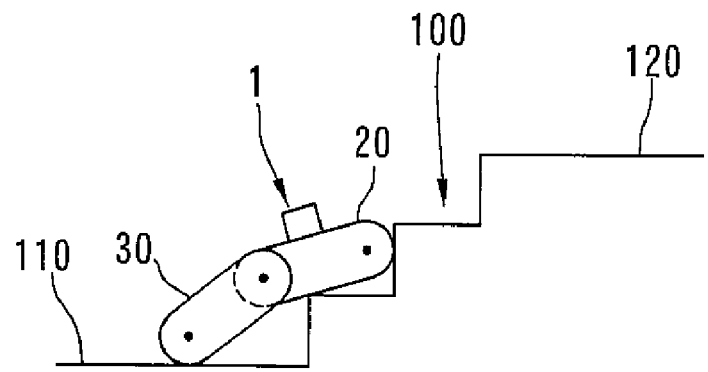
FIG. 17E is a schematic side view of the crawler device in a next state following the one depicted in FIG. 17D.
Figure 17F:
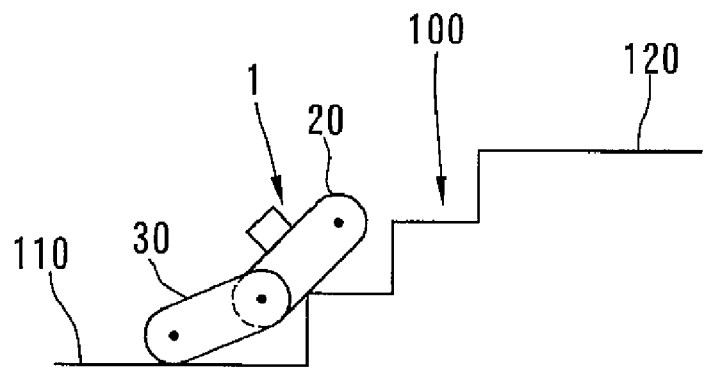
FIG. 17F is a schematic side view of the crawler device in a next state following the one depicted in FIG. 17E.
Figure 17G:
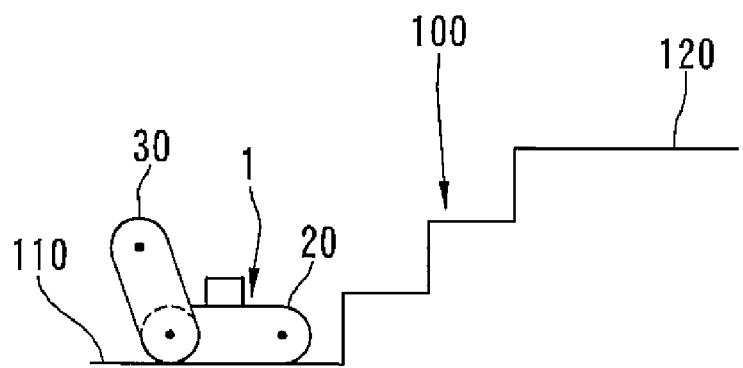
FIG. 17G is a schematic side view of the crawler device in a next state following the one depicted in FIG. 17F.

As the crawler device further proceeds towards the stairs, the direction of measurement D3 of the distance sensor 63 is shifted away from the upper road surface 120 as shown in FIG. 17B, and the distance sensor comes to measure a distance to a going of the highest stair of the stairs 100. At this time, the measured distance becomes equal to or greater than 200 mm, and an affirmative judgment is made in Step 251.

The judgment as to whether a distance measured by the distance sensor 64 is equal to or greater than 300 mm is made as necessary. This judgment is for avoiding the attitude control in case there is a dead end with a wall or something immediately near the stairs or step.

If a judgment is made that there is a dead end in Step 251 based on the distance measured by the distance sensor 64, alternatively the crawler device may be forcibly prohibited from proceeding forward. The judgment based on the distance measured by the distance sensor 64 may be omitted in Step 251.

In Step 251, instead of judging whether the distance measured by the distance sensor 63 is equal to or greater than 200 mm, a judgment may be made whether the distance measured by the distance sensor 63 falls within a range of from 200 to 500 mm. If the distance exceeds 500 mm, i.e. there is a cliff lying ahead, negative judgment is made and the automatic attitude control in Step 252 and the subsequent steps will not be executed. Alternatively the crawler device may be forcibly prohibited from proceeding forward.

If the judgment is affirmative in Step 251, the flow proceeds to Step 252, where the auxiliary crawler 30 is rotated downward to be positioned at an angle of −30 degrees with respect to the main crawler 20. As a result, the auxiliary crawler 30 tilts downward toward the stairs. At this time, the device body 10 is generally maintained in a horizontal position since the device body is heavier than the auxiliary crawler 30.

When the center of gravity of the crawler device passes the nosing 100a of the highest stair, the crawler device is rotated forward. At this time, the tilted auxiliary crawler 30 hits the going of the highest stair of the stairs 100, and therefore, the rotation angle of the crawler device can be restrained and thus the impact can be alleviated.

In Step 252, the tilt angle of the auxiliary crawler 30 with respect to the main crawler 20 can be set at any angle within an angular range of from −20 to −45 degrees.

Following Step 252, a judgment is made again whether the descent mode is maintained (Step 253). If the judgment is affirmative, the flow proceeds to Step 254, where a judgment is made whether the distance measured by the distance sensor 64 is equal to or smaller than a threshold distance of, for example 600 mm. If the judgment is negative, Steps 252, 253 and 254 are repeated. As a result, the crawler device descends the stairs maintained in the attitude shown in FIG. 17D.

While the crawler device is descending the stairs 100, the direction of measurement of the distance sensor 64 is shifted away from the going of the stairs 100 to the lower road surface 110. As the crawler device moves further downward, the measured distance becomes shorter. When the front end portion of the auxiliary crawler 30 reaches the road surface 110 or immediately before or immediately after the front end portion of the auxiliary crawler 30 reaches the road surface 110, the measured distance becomes equal to or smaller than 600 mm.

If the judgment is affirmative in Step 254, the auxiliary crawler 30 is positioned at an angle of +75 degrees with respect to the main crawler 20. Since the auxiliary crawler 30 is rotated slowly as the crawler device proceeds, the main crawler 20 can land on the road surface softly. This alleviates or eliminates the impact to the device body 1 (refer to FIGS. 17F and 17G).

Figure 18:
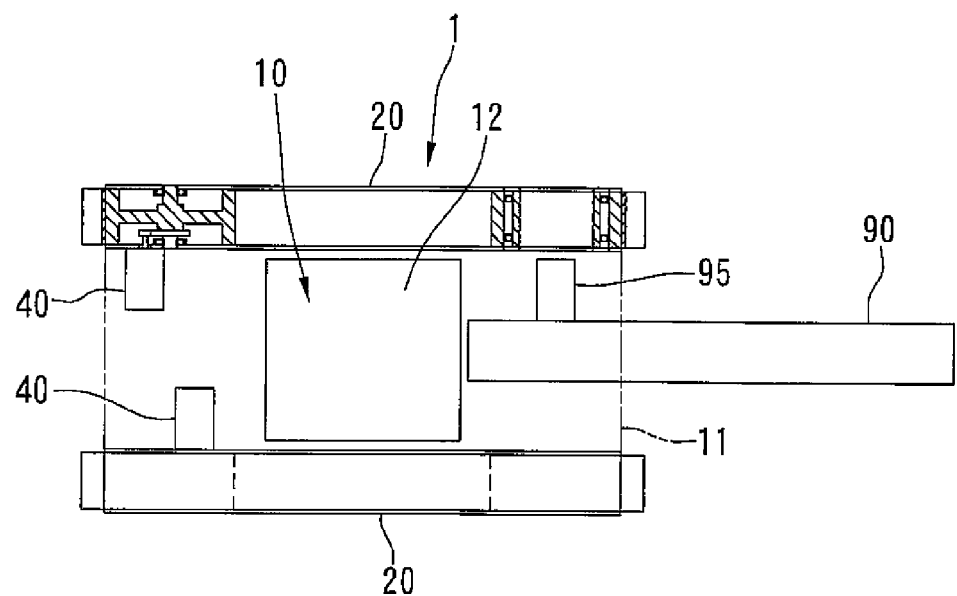
FIG. 18 is a partially cut-away plan view of a crawler device according to a third embodiment of the present invention.
Figure 19:
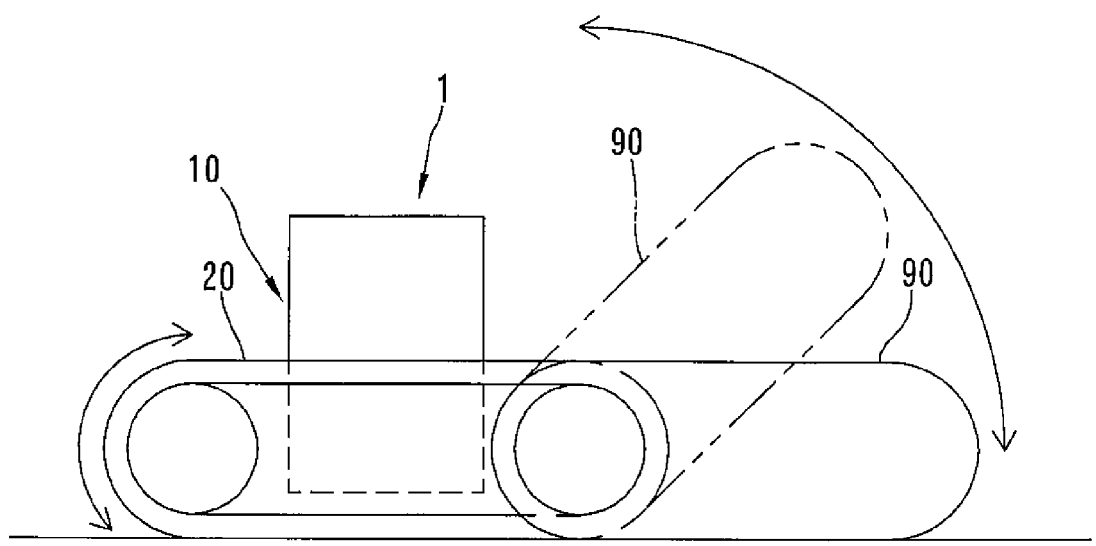
FIG. 19 is a side view of a crawler device according to the third embodiment of the present invention.

FIGS. 18 and 19 show a third embodiment of the present invention. In the third embodiment, an elongate auxiliary plate 90 is used as an auxiliary member in place of the auxiliary crawler 30 in the first and second embodiments. A casing of a rotary motor 95 (actuator) for rotating the auxiliary plate 90 with respect to the main crawler 20 is fixed to the base 10 of the device body 1. An output shaft of the rotary motor 95 is fixed to the auxiliary plate 90. Other structures and control method of the crawler device according to the third embodiment is the same as those according to the first and second embodiments, and therefore, description thereof is omitted. The auxiliary plate 90 works in the same manner as the auxiliary crawler by sliding on stairs or a step.

While preferred embodiments have been described, various modifications can be made without departing from the spirit of the present invention. Application of the crawler device according to the present invention is not limited to survey work. The present invention can be applied to any crawler device which is required to be small-sized, to be able to ride over a step or to be able to ascend and descend stairs.

The tilt sensor can be disposed anywhere as long as it can detect the tilt angle of the device body. The tilt sensor may be disposed at the side plate of the main crawler. The tilt sensor may be of a type that can detect a tilt in the front-rear direction only or may be composed of two sensor portions that can respectively detect tilt in the front-rear direction and the left-right direction.

In the ascent mode, descent mode and the mode for riding on step on one side, the main crawler 20 may be automatically controlled with the controller 65 to run at a predetermined relatively low speed.

The controller 65 may automatically control the attitude of the auxiliary crawler 30 based on the automatic recognition of stairs or a step instead of responding to mode commands from the remote controller. In this case, the stairs or step is automatically recognized based on sensor information from sensors such as the distance sensor disposed on the device body 1.

The controller 65 may be disposed separate from the device body 1. The controller may be composed of an attitude control section and a running control section separate from each other.

The distance sensor may adopt a scanning system in which information on distance within a predetermined angular range can be obtained. In this case, one sensor can perform the functions of both the distance sensors 61 and 62 and another sensor can perform the functions of both the distance sensors 63 and 64.

The distance sensors may be omitted. In this case, the automatic attitude control is executed using only the tilt sensor.

When resistance at the speed reduction mechanism of the rotation motor 50 is relatively great, the crawler device can land softly if the auxiliary crawler is made freely rotatable instead of rotating the auxiliary crawler when the crawler device finishes landing.

INDUSTRIAL APPLICABILITY

The present invention may be applied to a crawler device such as a small-sized crawler device for survey work.

The invention claimed is:

1. A crawler device comprising:
a device body having a pair of left and right main crawlers, each of the main crawlers including an endless belt;
a pair of left and right auxiliary crawlers extending in a straight line, each of the auxiliary crawlers including another endless belt and connected to a corresponding one of the main crawlers through a common sprocket, thereby synchronously driven with the corresponding main crawler;
a tilt sensor for detecting a tilt angle of the device body in a front-rear direction; and
a controller for controlling an angle of the auxiliary crawler with respect to the main crawler; wherein each of the pair of main crawlers has an inner side plate and an outer side plate;
each of the pair of auxiliary crawlers has an inner side plate and an outer side plate;
each of the auxiliary crawlers is connected to only one of opposite end portions of the corresponding main crawler opposing in a direction of travel of the corresponding main crawler and is disposed outside of the corresponding main crawler;
a support having a cylindrical configuration is fixed to the inner side plate at the one of opposite end portions of the each of the main crawlers;
the common sprocket is rotatably supported at an outer periphery of the support;
an actuator is received in and fixed to the each support, an output shaft of the actuator being fixed to the outer side plate of the corresponding auxiliary crawler so that the pair of auxiliary crawlers can be rotated independently of each other over the entire angular range;
a maximum overall length of the crawler device is the length of the crawler device when the main crawler and the auxiliary crawler are arranged in alignment with each other;
a minimum overall length of the crawler device is equal to the length of the main crawler or the auxiliary crawler when the main crawler and the auxiliary crawler are positioned to overlap each other;
before the device body ascends a step or stairs with the auxiliary crawler positioned backward, the controller controls the actuator to bring the auxiliary crawler into a preparatory state in which the auxiliary crawler is freely rotatable with respect to the main crawler or the auxiliary crawler is maintained in a rotated position above a line extending longitudinally from the main crawler; and
when the main crawler starts ascending the step or stairs and the tilt angle of the device body detected by the tilt sensor reaches or exceeds a first threshold angle, the controller controls the actuator to cause the auxiliary crawler to be rotated downward.

2. The crawler device according to claim 1 wherein the controller causes the auxiliary crawler to be in alignment with or in near alignment with the main crawler when the tilt angle of the device body detected by the tilt sensor reaches or exceeds the first threshold angle.

3. The crawler device according to claim 1 wherein the length of the main crawler is smaller than twice a distance between adjacent stair nosings of the stairs to be ascended and the maximum overall length of the crawler device is greater than twice the distance between the adjacent stair nosings and smaller than three times the distance between the adjacent stair nosings.

4. The crawler device according to claim 1 wherein when the tilt angle of the device body detected by the tilt sensor becomes equal to or smaller than a second threshold angle that is smaller than the first threshold angle as the main crawler rides over the step or stairs, the controller causes the auxiliary crawler to return to the preparatory state.

5. The crawler device according to claim 1 wherein the controller causes the auxiliary crawler to be maintained in alignment with or in near alignment with the main crawler behind the main crawler while the controller causes the main crawler to proceed forward and descend the step or stairs; and wherein when the tilt angle of the device body detected by the tilt sensor becomes equal to or smaller than a third threshold angle before the crawler device finishes descending the step or stairs, the controller causes the auxiliary crawler to be rotated upward with respect to the main crawler, thereby reducing the tilt angle of the device body.

6. The crawler device according to claim 1 wherein the tilt sensor can also detect a tilt angle in a left-right direction; and wherein when the tilt angle of the device body in the left-right direction detected by the tilt sensor reaches or exceeds a fourth threshold angle as one of the main crawlers rides on the step, the controller causes the auxiliary crawler connected to the other of the main crawlers to be rotated downward, thereby causing the other of the main crawlers to be raised to reduce the tilt angle of the device body in the left-right direction.

7. The crawler device according to claim 2 wherein the device body has a first distance sensor disposed in an end portion of the device body to which the auxiliary crawlers are not disposed, the first distance sensor measuring distance in an obliquely downward direction; and wherein when the distance detected by the first distance sensor reaches or exceeds a first threshold distance immediately before the crawler device finishes ascending the step or stairs, the controller causes the auxiliary crawler to be rotated downward, thereby reducing the tilt angle of the device body.

8. The crawler device according to claim 7 wherein when the distance detected by the first distance sensor reaches or exceeds a second threshold distance immediately before the crawler device starts descending the step or stairs with the auxiliary crawler positioned backward, the controller causes the auxiliary crawler to be rotated downward, thereby tilting the device body downward toward the front.

9. The crawler device according to claim 7 wherein the device body has a second distance sensor disposed in the end portion of the device body in which the auxiliary crawlers are not disposed, the second distance sensor measuring distance in a direction higher than the direction of measurement of the first distance sensor; and wherein when the distance detected by the second distance sensor becomes equal to or smaller than a third threshold distance immediately before the crawler device finishes descending the step or stairs, the controller causes the auxiliary crawler to be rotated upward, thereby reducing the tilt angle of the device body.

10. The crawler device according to claim 9 wherein the device body has a third distance sensor disposed in an end portion of the device body in which the auxiliary crawlers are disposed, the third distance sensor measuring distance in an obliquely downward direction; and wherein when the distance detected by the third distance sensor reaches or exceeds a fourth threshold distance immediately before the crawler device starts to descend the step or stairs with the auxiliary crawlers positioned forward, the controller causes the auxiliary crawlers to be rotated downward, thereby tilting the auxiliary crawlers downward toward the front.

11. The crawler device according to claim 10 wherein the device body has a fourth distance sensor disposed in the end portion of the device body in which the auxiliary crawlers are disposed, the fourth distance sensor measuring distance in a direction higher than the direction of measurement of the third distance sensor; and wherein when the distance detected by the fourth distance sensor becomes equal to or smaller than a fifth threshold distance immediately before the crawler device finishes descending the step or stairs, the controller causes the auxiliary crawlers to be rotated upward.

* * * * *